United States Patent [19]
Suzuki et al.

[11] Patent Number: 5,675,738
[45] Date of Patent: Oct. 7, 1997

[54] VIDEO INFORMATION SERVER SYSTEM INCLUDING SERVER CENTER COOPERATING WITH REQUEST TERMINALS PERFORMING VIDEO ON DEMAND

[75] Inventors: Youko Suzuki; Hiroyuki Hatta; Mamoru Udagawa; Hiroshi Niimi; Masayuki Ozawa; Kenji Tanaka, all of Kawasaki, Japan

[73] Assignee: Fujitsu Limited, Kanagawa, Japan

[21] Appl. No.: 568,178

[22] Filed: Dec. 6, 1995

[30] Foreign Application Priority Data

Feb. 8, 1995 [JP] Japan ................. 7-020362

[51] Int. Cl.⁶ .................................. H04N 7/173
[52] U.S. Cl. ............... 395/200.09; 348/7; 348/12; 348/13; 455/5.1
[58] Field of Search .............. 348/6, 7, 12, 13, 348/14, 16, 17; 455/3.1, 4.1, 4.2, 5.1, 6.1, 6.3; 395/200.09; H04N 7/10, 7/173

[56] References Cited

U.S. PATENT DOCUMENTS

| 5,132,992 | 7/1992 | Yurt et al. ............... | 455/5.1 |
| 5,410,343 | 4/1995 | Coddington et al. ........ | 348/7 |
| 5,488,411 | 1/1996 | Lewis ..................... | 455/6.3 |
| 5,508,732 | 4/1996 | Bottomley et al. ......... | 348/7 |
| 5,521,631 | 5/1996 | Budow et al. ............. | 348/7 |

OTHER PUBLICATIONS

W.D. Sincoskie, System Architecture for a Large Scale Video on Demand Service, Computer Networks and ISDN Systems 22, pp. 155-162 1991.

A.D. Gelman et al., A Store–and–Forward Architecture for Video–On–Demand Service, Proceedings of the International Communications Conference Jun. 1991.

T.D.C. Little et al., A Digital On–Demand Video Service Supporting Content–Based Queries, ACM Multimedia, pp. 427–436 1993.

Primary Examiner—John K. Peng
Assistant Examiner—Nathan J. Flynn
Attorney, Agent, or Firm—Helfgott & Karas, P C.

[57] ABSTRACT

A video information server system which makes it possible for a party to remotely control any of a plurality of video information server apparatuses holding a plurality of types of video information different in type from each other through a communication network and thereby easily obtained desired video information, the system being provided with a video information server center including a plurality of video information server apparatuses and a center control equipment for selecting one of these apparatuses in accordance with a request from a request terminal and sending the video information of the request and the central control equipment being provided with a common management file for recording various data for converting requests from terminals compatible with all of the plurality of video information server apparatuses into requests corresponding to the individual apparatuses.

12 Claims, 23 Drawing Sheets

Fig.6

| TOTAL NUMBER OF APPARATUSES | TYPE OF APPARATUS | ACCELERATION AT NORMAL TAPE FEED | FEED SPEED AT FAST-FORWARD/REWIND | DECELERATION AT FAST-FORWARD/REWIND | ... | NORMAL TAPE FEED SPEED | DECELERATION AT NORMAL TAPE FEED | ACCELERATION AT FAST-FORWARD/REWIND | TYPE OF APPARATUS | ACCELERATION AT NORMAL TAPE FEED | FEED SPEED AT FAST-FORWARD/REWIND | DECELERATION AT FAST-FORWARD/REWIND | NORMAL TAPE FEED SPEED | DECELERATION AT NORMAL TAPE FEED | ACCELERATION AT FAST-FORWARD/REWIND |

{ INFORMATION FOR ONE APPARATUS } ... { INFORMATION FOR ONE APPARATUS }

⎧ (INFORMATION FOR ONE APPARATUS) × (TOTAL NUMBER OF APPARATUSES) ⎫

| TOTAL NUMBER OF APPARATUSES | TYPE OF CONNECTED APPARATUS | NAME OF CONNECTED HOST | | TYPE OF CONNECTED APPARATUS | NAME OF CONNECTED HOST |
|---|---|---|---|---|---|
| | CONNECTED PORT NUMBER | VIDEO SWITCH INPUT SIDE CHANNEL NUMBER | ----- | CONNECTED PORT NUMBER | VIDEO SWITCH INPUT SIDE CHANNEL NUMBER |

Braces: { TYPE OF CONNECTED APPARATUS, NAME OF CONNECTED HOST, CONNECTED PORT NUMBER, VIDEO SWITCH INPUT SIDE CHANNEL NUMBER } = ONE CONNECTED APPARATUS WORTH OF INFORMATION (ONE CONNECTED APPARATUS WORTH OF INFORMATION) × (TOTAL NUMBER OF APPARATUSES)

43

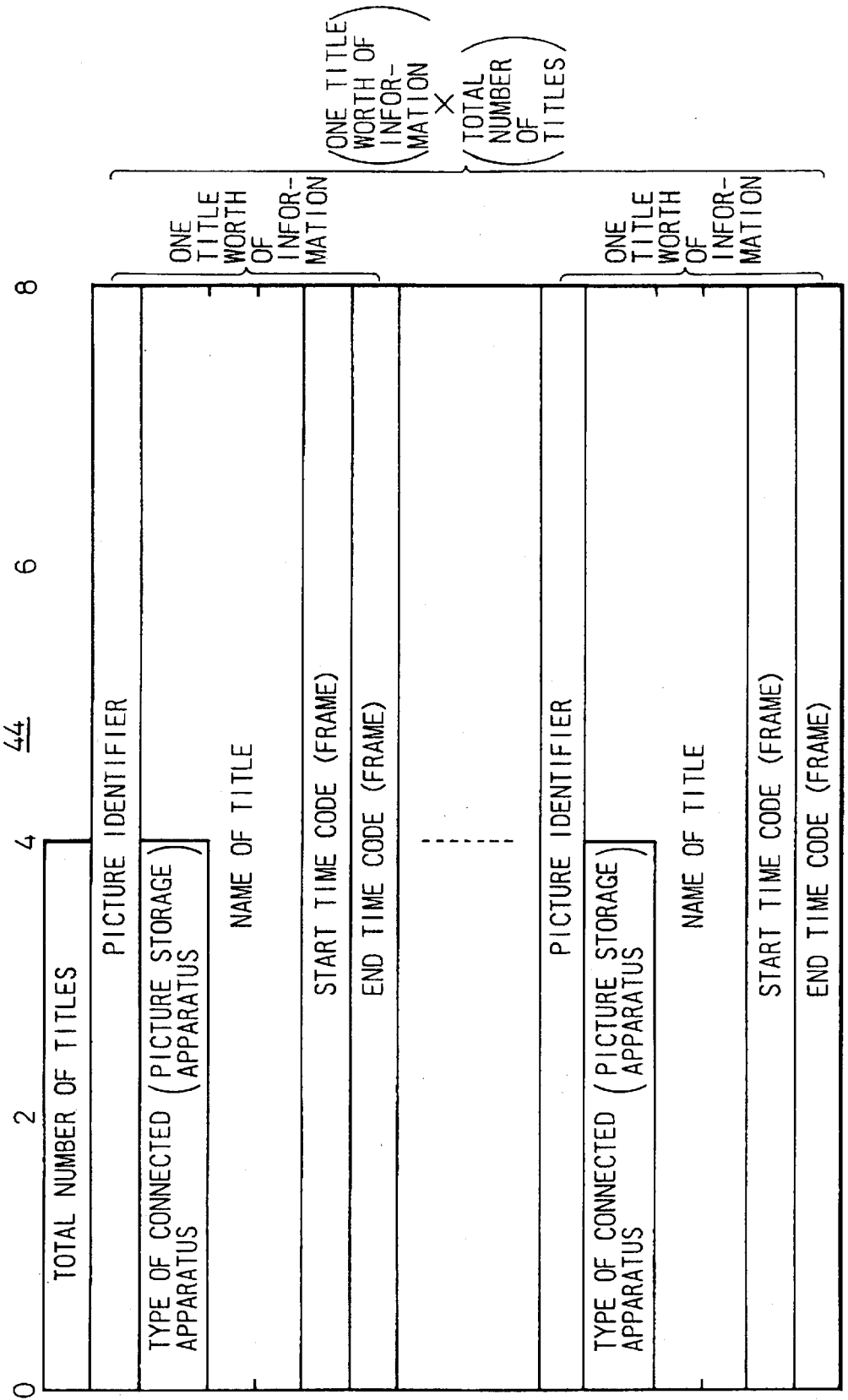

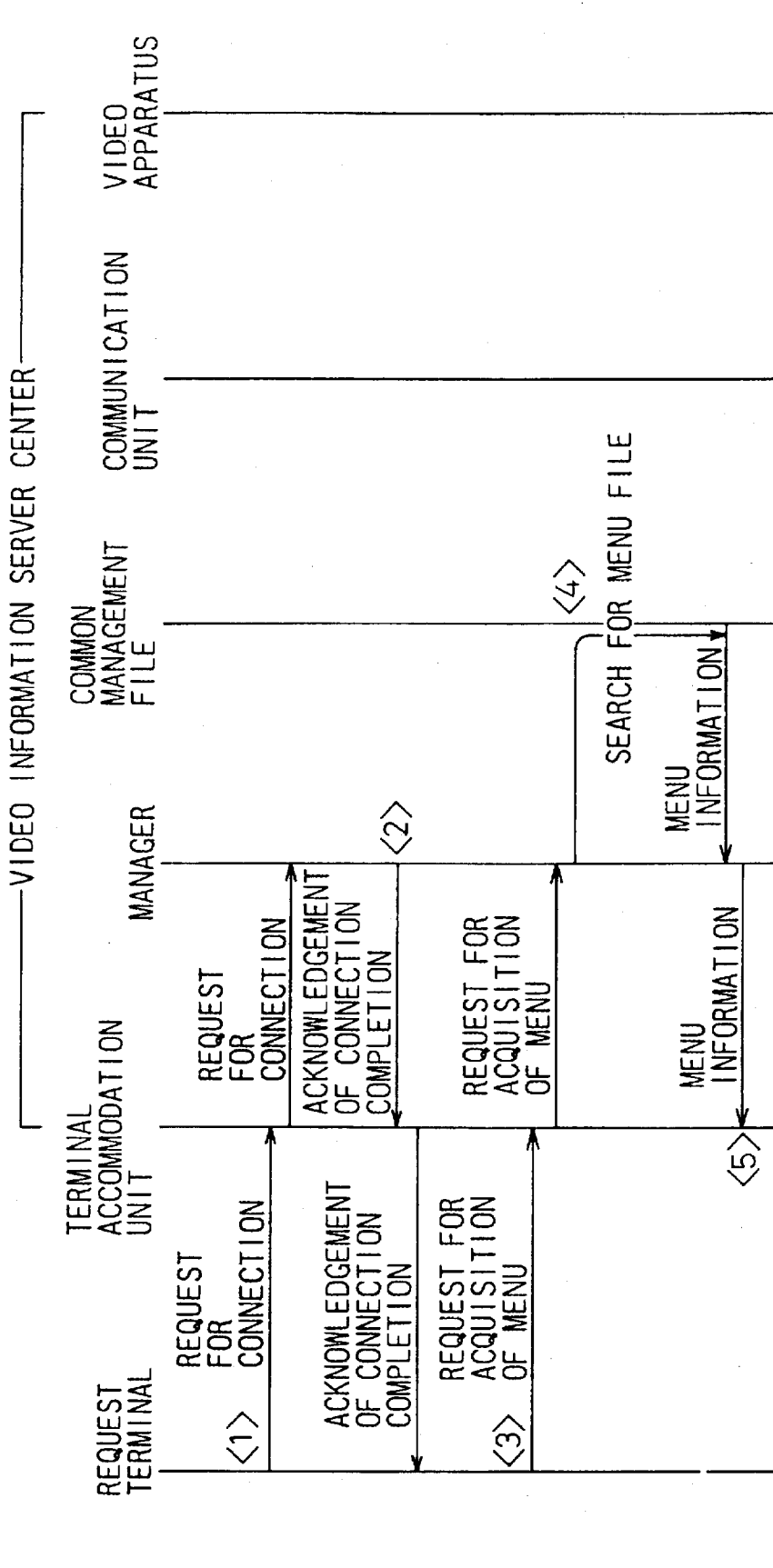

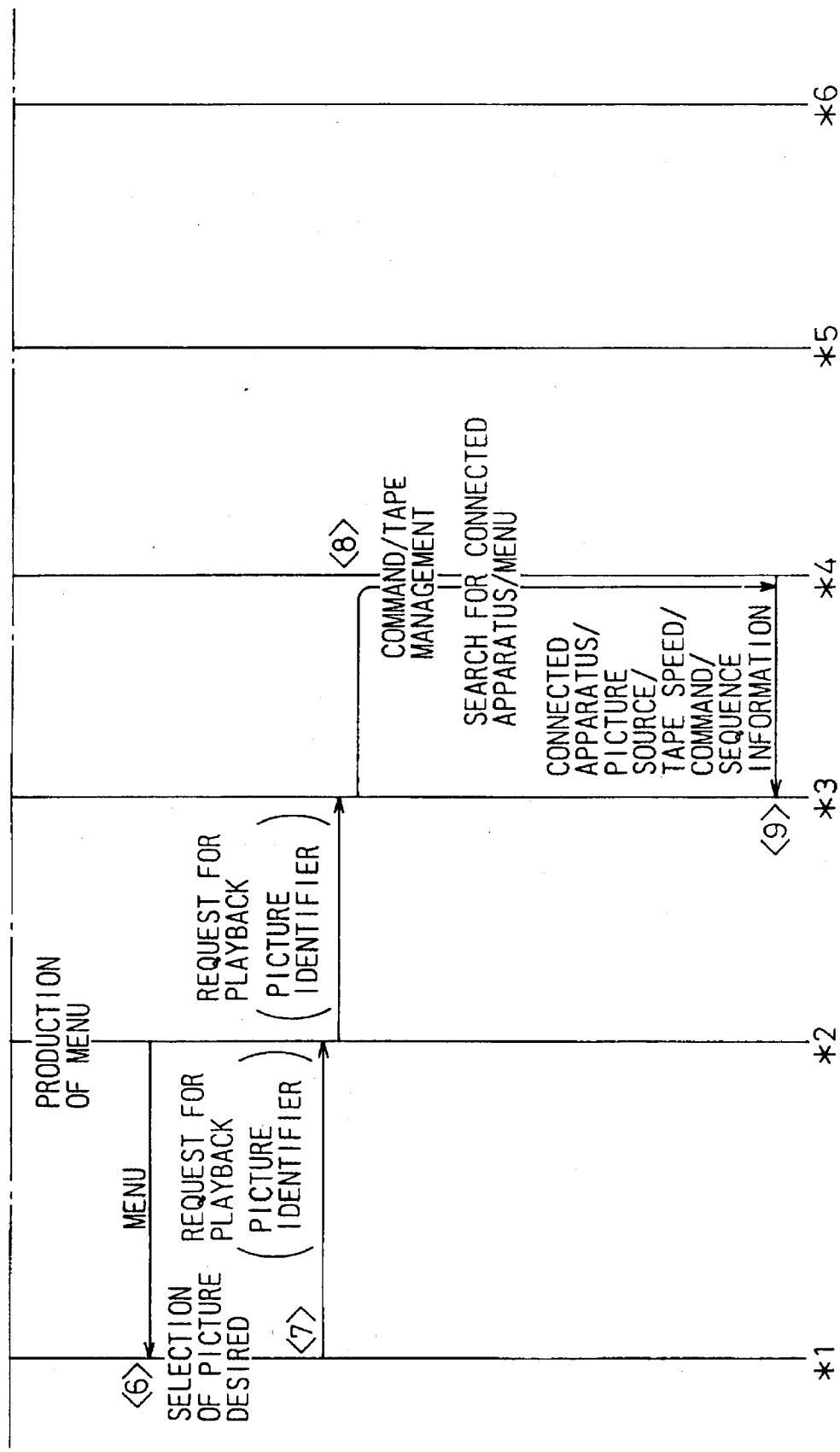

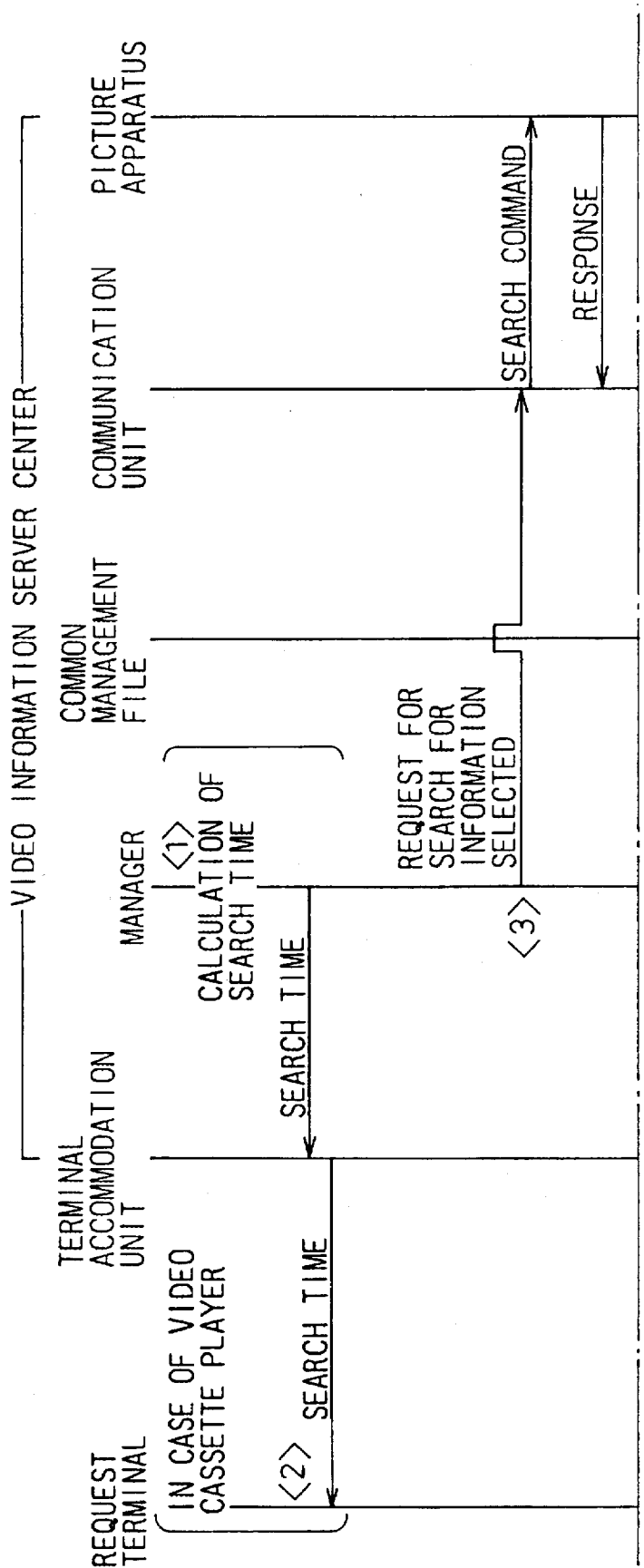

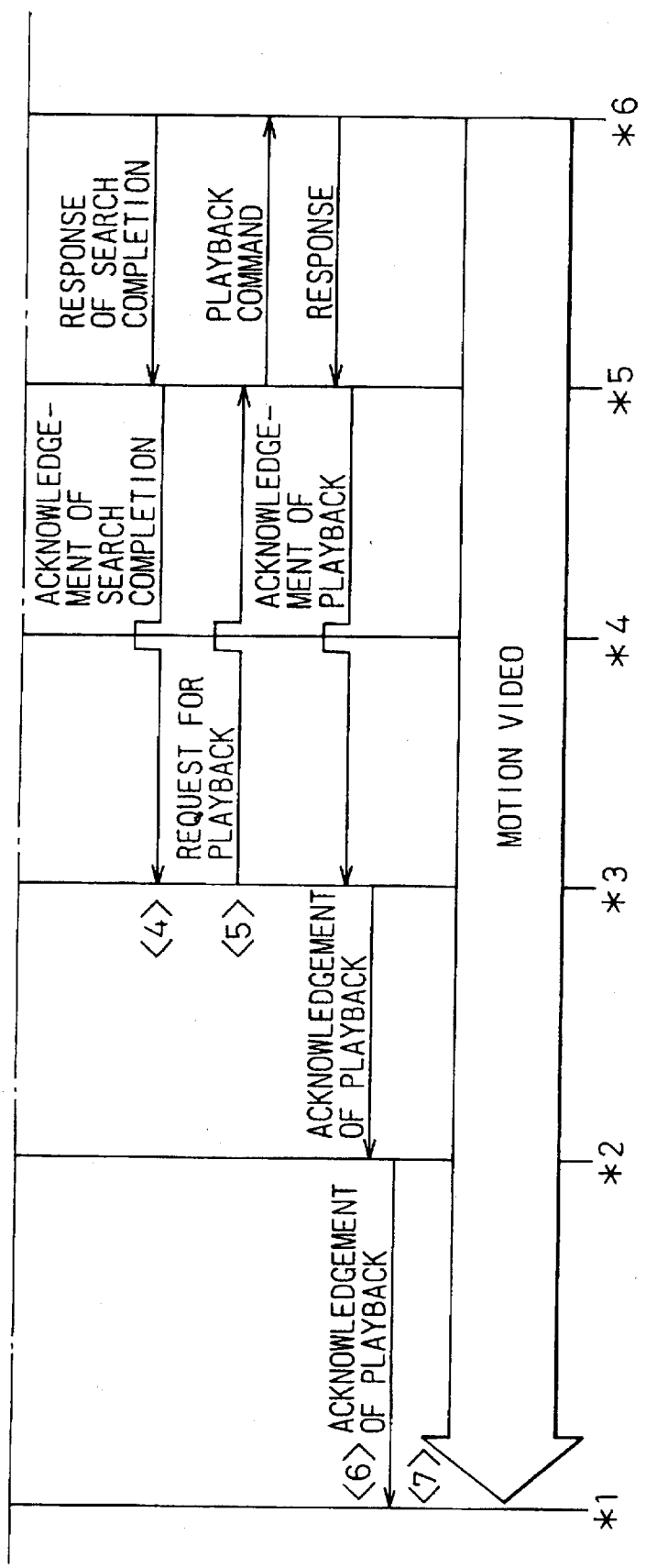

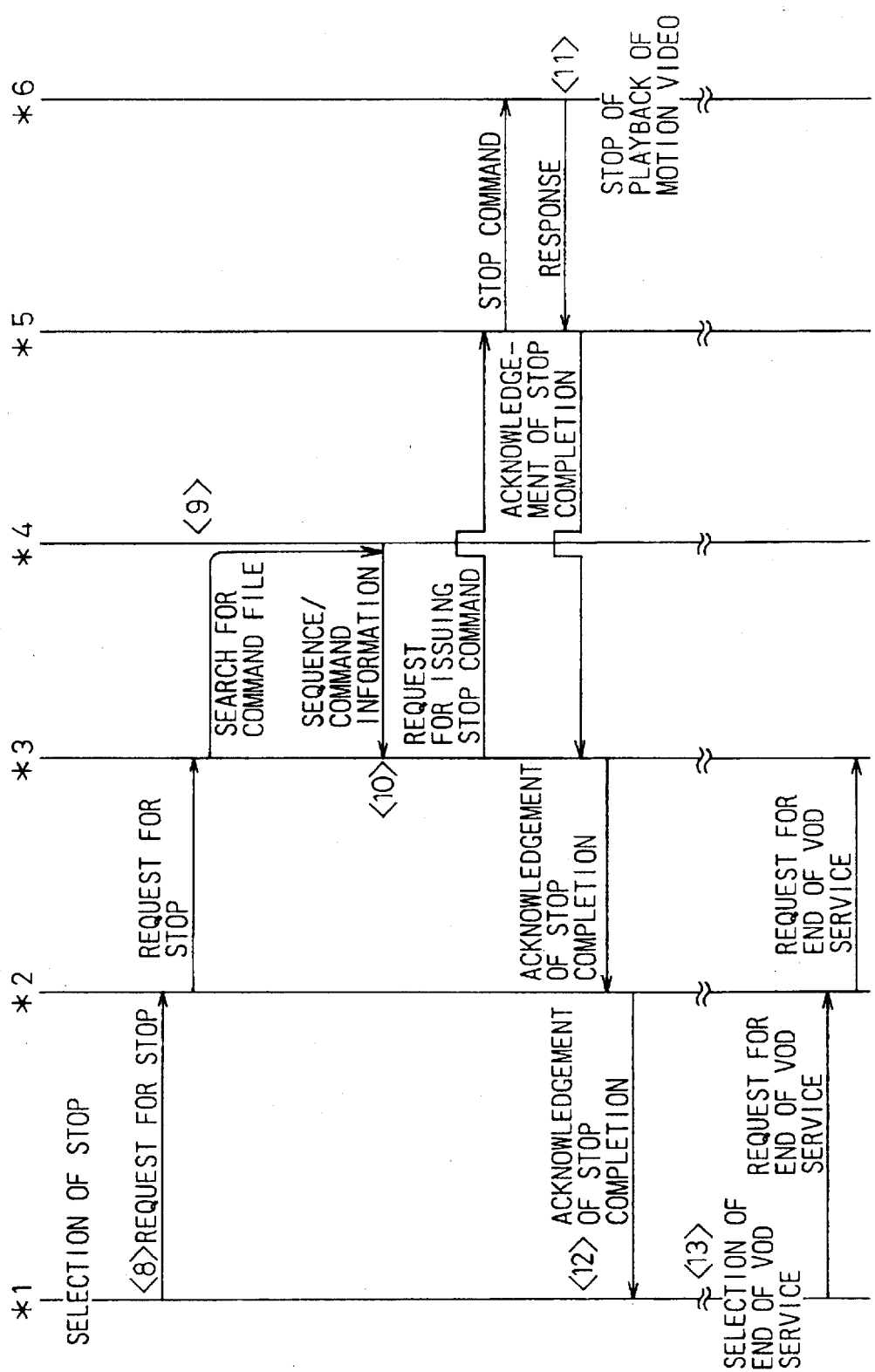

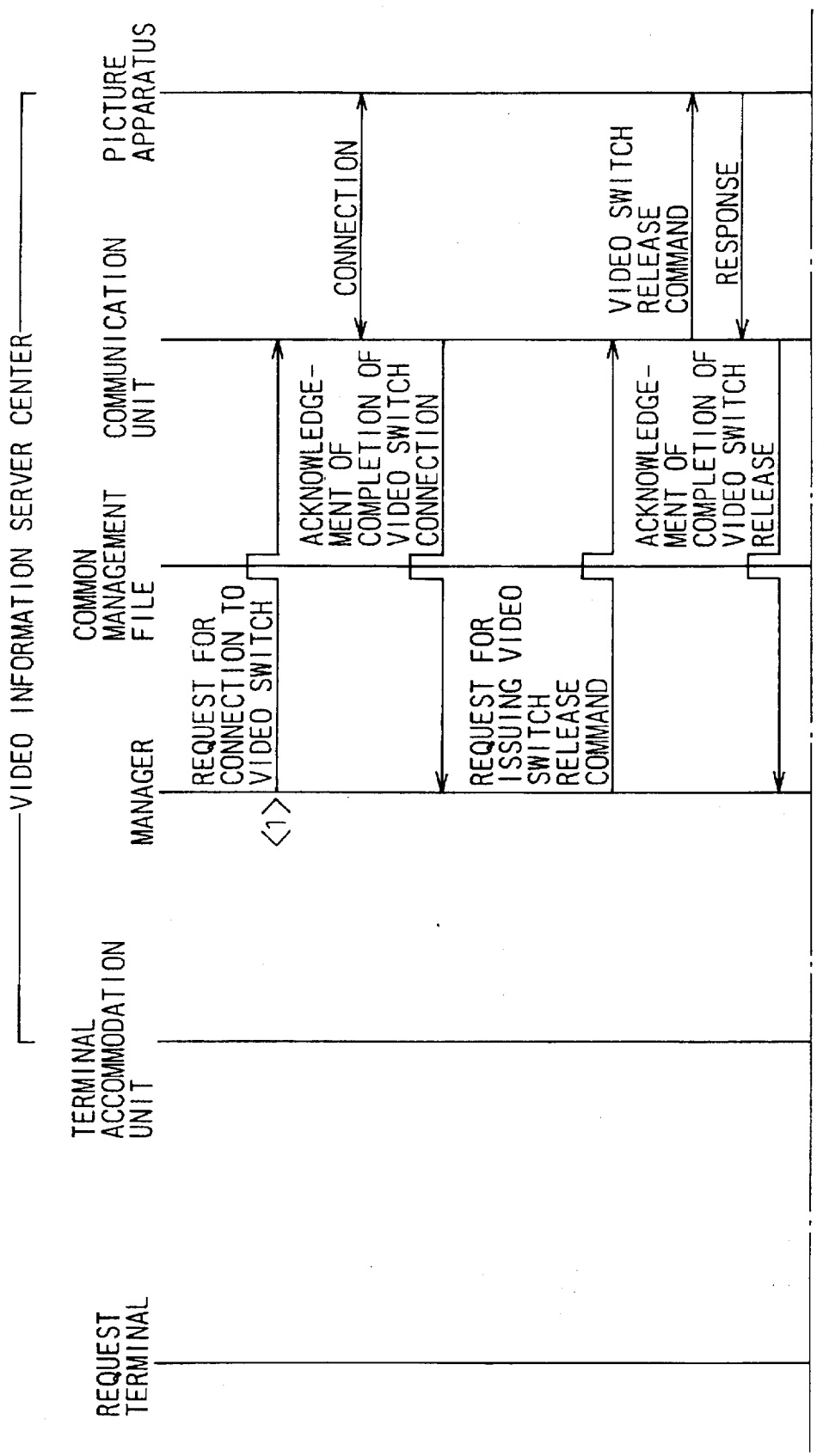

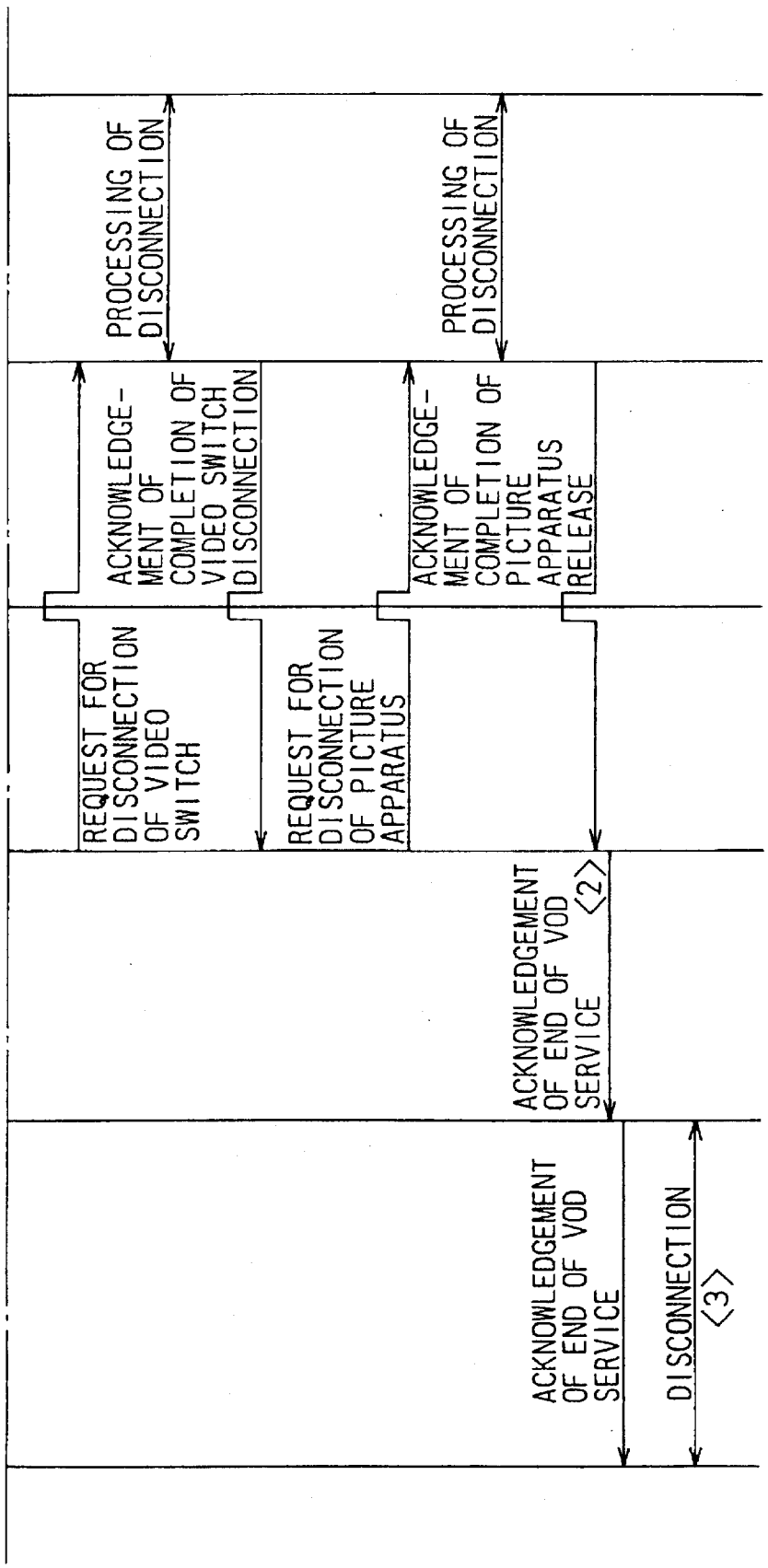

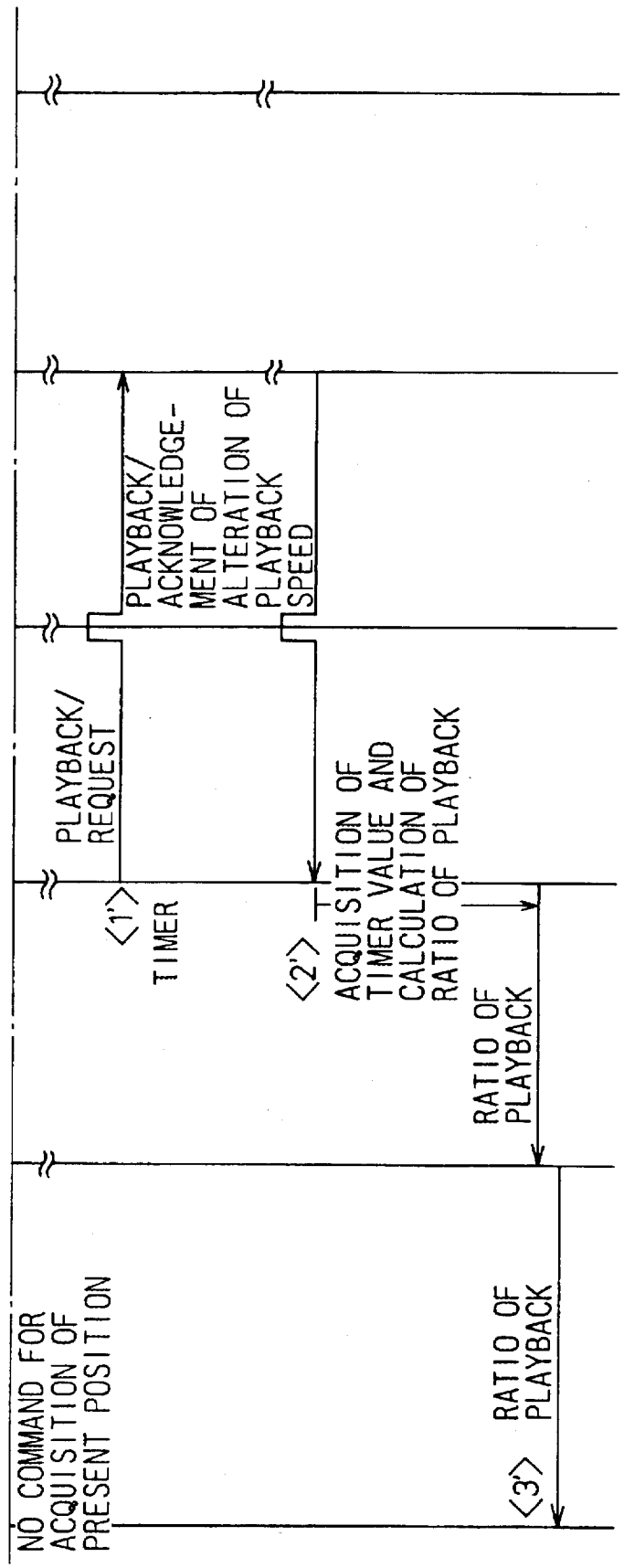

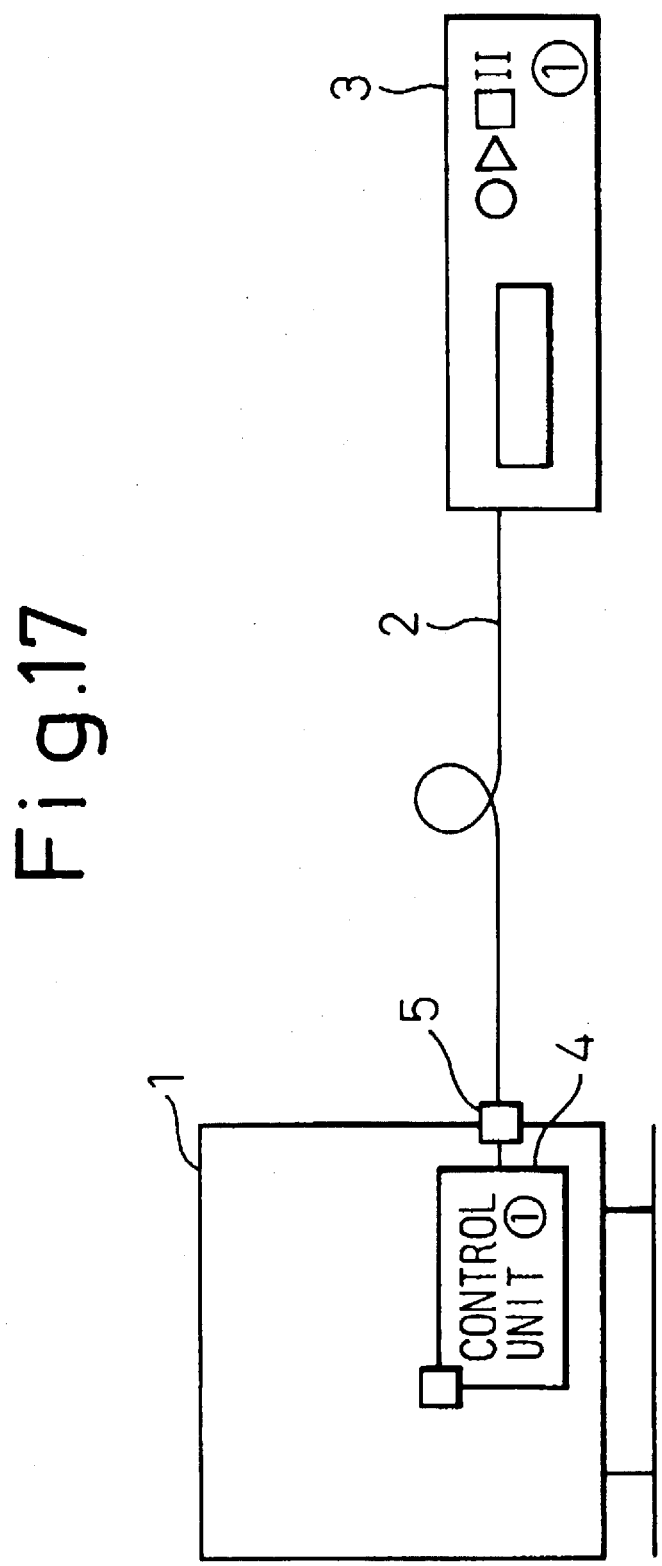

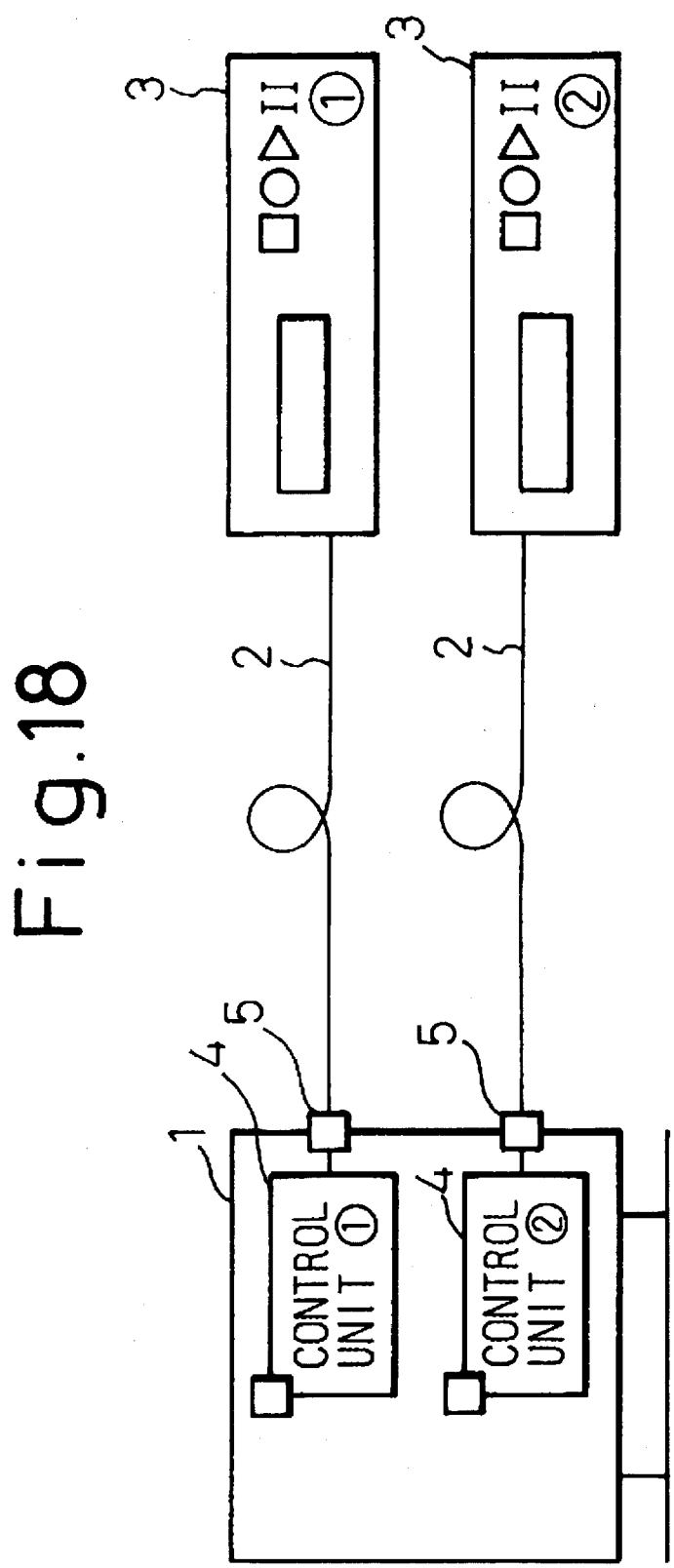

VIDEO INFORMATION SERVER SYSTEM INCLUDING SERVER CENTER COOPERATING WITH REQUEST TERMINALS PERFORMING VIDEO ON DEMAND

BACKGROUND OF THE INVENTION

1. Field of the Invention

The present invention relates to a video information server system and to a video information server center and request terminals constituting the same.

Video on demand (VOD) is being developed as one of the main multimedia services for the home. A VOD service would enable a home user to obtain any video information he or she desires immediately in real time at his or her request terminal.

2. Description of the Related Art

As explained in detail later with reference to the drawings, in general, a video information server system includes a video information server apparatus holding the video information. The video information server apparatus is designed to be operated by outside users by remote control using a PC or other computer (request terminal). Toward this end, the video information server apparatus is connected to the computer through a communication network by a serial port provided on the computer.

A home user desiring video information would utilize a mouse or keyboard to select from various commands shown on a video display unit (not shown) with the computer so as to obtain the desired video information.

To make such a VOD service possible, a special program is prepared which is suitable for commands issuing to the video information server apparatus connected to the computer. The program is stored in a control unit inside the computer. The video information server system functions under the control of this program.

In one conventional video information server system, the video information server apparatus was directly connected to the serial port provided on the computer. Normally, there is only one such serial port. Accordingly, there was the first problem that it was only possible to receive video information from a single video information server apparatus.

If use were made of a computer having two serial ports, another video information server system can be realized provided with two different video information server apparatuses. In such a system, however, a second problem arises in that the commands for one video information server apparatus (first system) in the video information server system and the commands for the other video information server apparatus (second system) will not necessarily be the same. For example, the commands used will differ from each other when one apparatus is a video cassette tape player and the other apparatus is a video disk player.

In this case, it would be necessary for one control unit to store a first program designed to issue the commands for one apparatus and for another control unit to store a second program designed to issue the commands for the other apparatus.

In the final analysis, the conventional video information server systems were limited as to the number of video information server apparatuses which could be controlled by a computer. Also, that computer had to store a different remote control program for each of the video information server apparatuses.

SUMMARY OF THE INVENTION

Therefore, the present invention has as its object, in consideration of the above problems, to provide a VOD server system enabling individual request terminals (computers) to obtain the desired video information from any of a plurality of video information server apparatuses just by the provision of a single remote control program. That is, it enables remote control of a plurality of video information server apparatuses from individual request terminals without the user even being aware of the differences between these apparatuses.

To attain the above object, the video information server system of the present invention is provided with a video information server center including a plurality of video information server apparatuses and a center control apparatus for selecting one of these apparatuses in accordance with a request from a request terminal and providing the video information requested. The central control apparatus is provided with a common management file for storing the various data for converting generic requests from the terminals compatible with all of the plurality of video information server apparatuses into requests tailored to the individual apparatuses. Due to this, it becomes possible for a party to remotely control any of the plurality of different types of video information server apparatus holding the plurality of types of video information through a communication network and thereby easily obtain desired video information.

BRIEF DESCRIPTION OF THE DRAWINGS

The above object and features of the present invention will be more apparent from the following description of the preferred embodiments with reference to the accompanying drawings, wherein:

FIG. 6 is a view of a detailed example of a tape management file 42 shown in FIG. 4;

FIG. 7 is a view of a detailed example of an apparatus connection file 43 shown in FIG. 4;

FIG. 8 is a view of a detailed example of a menu file 44 shown in FIG. 4;

FIGS. 11A and 11B are first part of a sequence diagram showing a first example of the operation of the system as a whole;

FIGS. 13A and 13B are a first part of a sequence diagram showing a second example of the operation of the system as a whole;

FIG. 14 is a second part of the sequence diagram showing a second example of the operation of the system as a whole;

FIGS. 15A and 15B are sequence diagrams showing a third example of the operation of the system as a whole;

FIGS. 16A and 16B are sequence diagrams showing a fourth example of the operation of the system as a whole;

FIG. 17 is a view of a first example of a video information server system of the related art; and FIG. 18 is a view of a second example of a video information server system of the related art.

DESCRIPTION OF THE PREFERRED EMBODIMENTS

Figure 1:
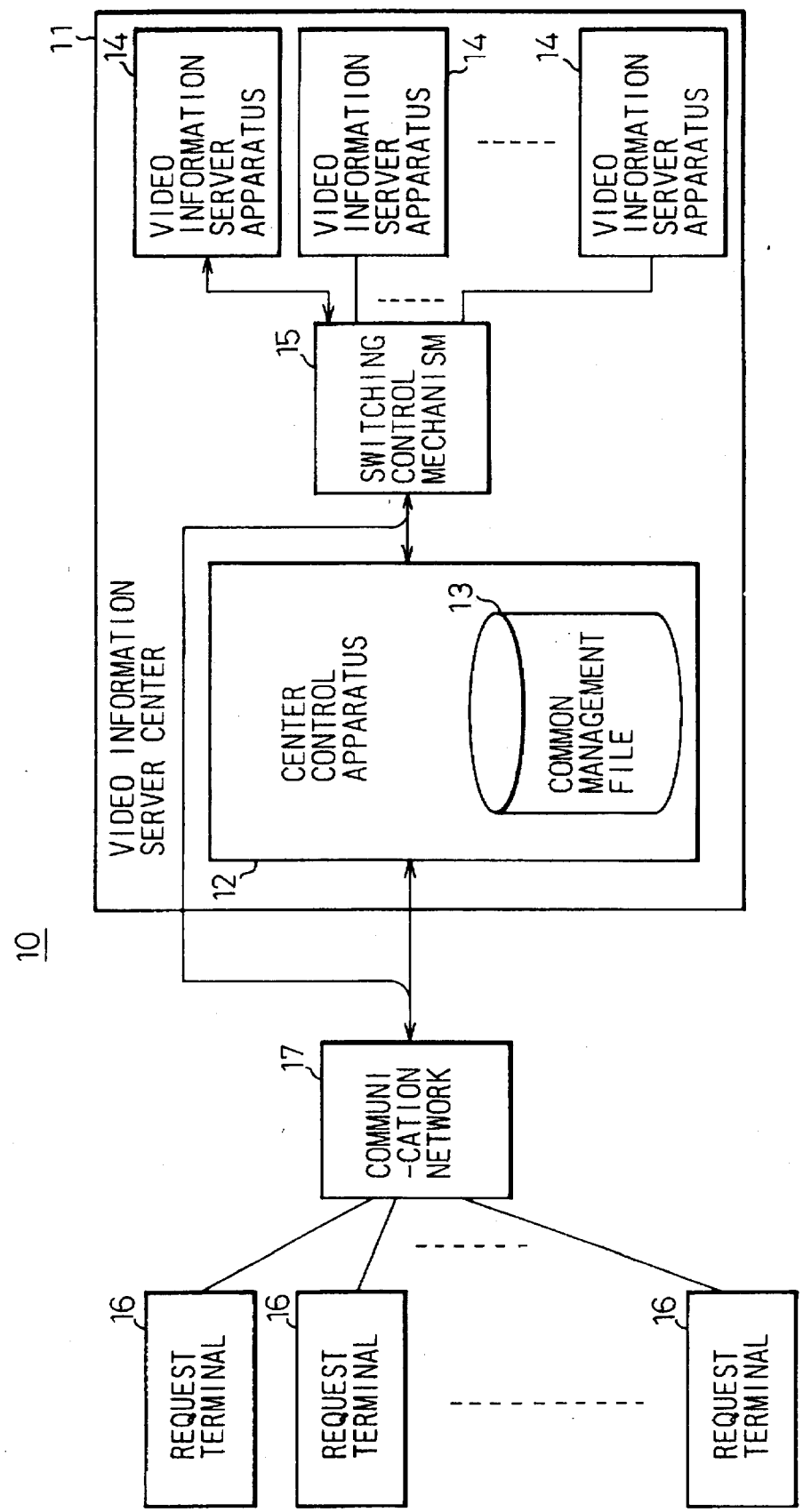
FIG. 1 is a view of the basic configuration of the present invention.

Before describing the embodiments of the present invention, the related art and the disadvantages therein will be described with reference to the related figures.

FIG. 17 is a view showing a first example of a video information server system of the related art. FIG. 18 is a view showing a second example of a video information server system of the related art. In these figures, reference numeral 3 is a video information server apparatus for holding video information. This video information server apparatus 3 is designed to be operated remotely from the outside by a computer (request terminal) 1, such as a PC. Accordingly, the computer 1 is connected to the video information server apparatus 3 through a serial port 5 provided at the computer 1.

A user desiring video information utilizes a mouse or keyboard to select from various commands shown on a video display unit (not shown) provided with the computer 1 so as to obtain the desired video information. The video information server apparatus 3 may be a video cassette player, a video disk player, a tuner, etc. If the apparatus 3 is a video cassette player, for example, the commands like "playback", "fast forward", "rewind", "pause", "stop" are shown on the screen of the video display unit as words or icons. The user selects the suitable command from these to obtain the desired video information.

In such a VOD service, referring to FIG. 17, a special program is prepared which is suitable for commands issuing to the video information server apparatus 3 connected to the computer 1. The program is stored in a control unit 4 inside the computer 1. The video information server system shown in FIG. 17 functions under the control of this program.

As explained earlier, in the above video information server system of FIG. 17, since the video information server apparatus 3 was directly connected to the normally single serial port provided at the computer 1, there was the first problem that it was only possible to receive video information from a single video information server apparatus 3.

In this case, if use were made of a computer 1 having two serial ports 5, another video information server system as shown in FIG. 18 could be realized provided with two different video information server apparatuses 3. In such a system, however, a second problem arises in that the commands for one video information server apparatus 3 (first system) in the video information server system shown in FIG. 18 and the commands for the other video information server apparatus 3 (second system) will not necessarily be the same. For example, the commands used will differ from each other when one apparatus 3 is a video cassette tape player and the other apparatus 3 is a video disk player.

In this case, it would be necessary for one control unit 4 to store a first program designed to issue commands for the one apparatus 3 and for another control unit 4 to store a second program designed to issue commands for the other apparatus 3.

In the final analysis, the conventional video information server systems were limited as to the number of video information server apparatuses which could be controlled by a computer. Also, that computer had to store a different remote control program for each of the video information server apparatuses.

The present invention provides a VOD server system enabling individual request terminals (computers 1) to obtain the desired video information from any of a plurality of video information server apparatuses just by the provision of a single remote control program. That is, it enables remote control of a plurality of video information server apparatuses from individual request terminals without the user being made aware of the differences between these apparatuses.

FIG. 1 is a view of the basic configuration of the present invention. In the figure, reference numeral 10 represents the video information server system as a whole. The system 10 may be roughly divided into a plurality of request terminals 16, a video information server center 11, and a communication network 17 connecting the same.

The video information server center 11 may be roughly divided into a central control apparatus 12, a plurality of video information server apparatuses 14, and switching control mechanism 15 connecting the same. The center control apparatus 12 contains a common management file 13.

In a first embodiment of the present invention, the constituent elements explained above are configured as follows:

The individual request terminals 16 request desired video information from the plurality of types of video information and receive that video information through the communication network 17.

The individual video information server apparatuses 14 hold the plurality of types of video information therein and can be controlled by control signals from the outside.

The center control apparatus 12 controls the individual video information server apparatuses 14 through the switching control mechanism 15, selects one of the plurality of video information server apparatuses 14 in accordance with a request from a request terminal 16 received through the communication network 17, and sends the selected video information through the communication network 17 to the request terminal 16.

The requests from the request terminals 16 are generic requests compatible with all of the plurality of different types of video information server apparatuses 14. The common management file 13 in the center control apparatus 12 is for converting generic requests to requests tailored to the individual apparatuses. The apparatus 12 selects and controls the video information server apparatus 14 for a specific request out of the plurality of video information server apparatuses 14 through the switching control mechanism 15 and sends the video information for the request to the request terminal 16 through the switching control mechanism 15 and the communication network 17.

A second embodiment of the present invention relates to just the video information server center 11 in the video information server system 10. The center 11, as explained above, is provided with the video information server apparatuses 14 and the center control apparatus 12. The center control apparatus 12 includes the above common management file 13. It selects and controls the video information server apparatus 14 for a specific request out of the plurality of video information server apparatuses 14 through the switching control mechanism 15 and sends the video information for the request to the request terminal 16 through the switching control mechanism 15.

In a third embodiment of the present invention, the content of the common management file 13 can be rewritten in accordance with an increase, change, or elimination of video information server apparatus 14.

In a fourth embodiment of the present invention, the common management file 13 includes a command file for storing data for converting generic requests relating to remote control from request terminals 16 into commands tailored to the individual video information server apparatuses 14.

In a fifth embodiment of the present invention, the common management file 13 includes a tape management file for storing management data for monitoring the feed of the video tape for video information server apparatuses 14 handling video tape.

In a sixth embodiment of the present invention, the common management file 13 includes an apparatus connection file for storing the connection data for connecting through the switching control mechanism 15 the video information server apparatus 14 holding the video information relating to the request from the request terminal 16 and the center control apparatus 12.

In a seventh embodiment of the present invention, the common management file 13 includes a menu file for storing data relating to the video information held by the individual video information server apparatuses 14.

In an eighth embodiment of the present invention, a manager for referring to the content of the common management file 13 is provided in the center control apparatus 12. This manager includes a calculation means for calculating, by referring to the tape management file, at least one of the current position of the feed of the video tape, the "playback ratio", showing what ratio of one unit of video data has been played back, and the search time, showing when the video information requested from the request terminal 16 can be started to be provided.

In a ninth embodiment of the present invention, the center control apparatus 12 is comprised of a terminal accommodation unit for connecting with a plurality of request terminals 16 through the communication network 17, a manager for referring to the content of the common management file 13 based on requests from individual request terminals 16 obtained through the terminal accommodation unit, and a communication unit for setting in the switching control mechanism 15 the connection path for sending out to the communication network 17 the video information from the video information server apparatus 14 relating to the request based on the result of the reference of content by the manager.

In a 10th embodiment of the present invention, the switching control mechanism 15 includes a video switch for setting up a connection path with the requested video information server apparatus 14 designated through the communication unit.

In an 11th embodiment of the present invention, a network converter connected with the communication unit through a local area network (LAN) and provided with a plurality of serial ports is included in the switching control mechanism 15. The individual video information server apparatuses 14 and the video switch are connected through the respectively corresponding serial ports.

The 12th embodiment of the present invention relates to just the request terminal 16 in the video information server system 10. This request terminal 16, as mentioned above, has a data communication unit for connection through the communication network 17 to the video information server center 11 provided with the plurality of different types of video information server apparatuses 14 and a common management file 13 enabling control of these plurality of video information server apparatuses 14 in a compatible manner. Further, it has a video display unit for showing the video information supplied through the communication network 17 and the data communication unit.

In a 13th embodiment of the present invention, a time display window for providing information on the search time until the start of the provision of the desired video information on the video display unit, calculated by the video information server center 11 and sent through the communication network 17, is formed on the screen of the video display unit in the request terminal 16.

Figure 2:
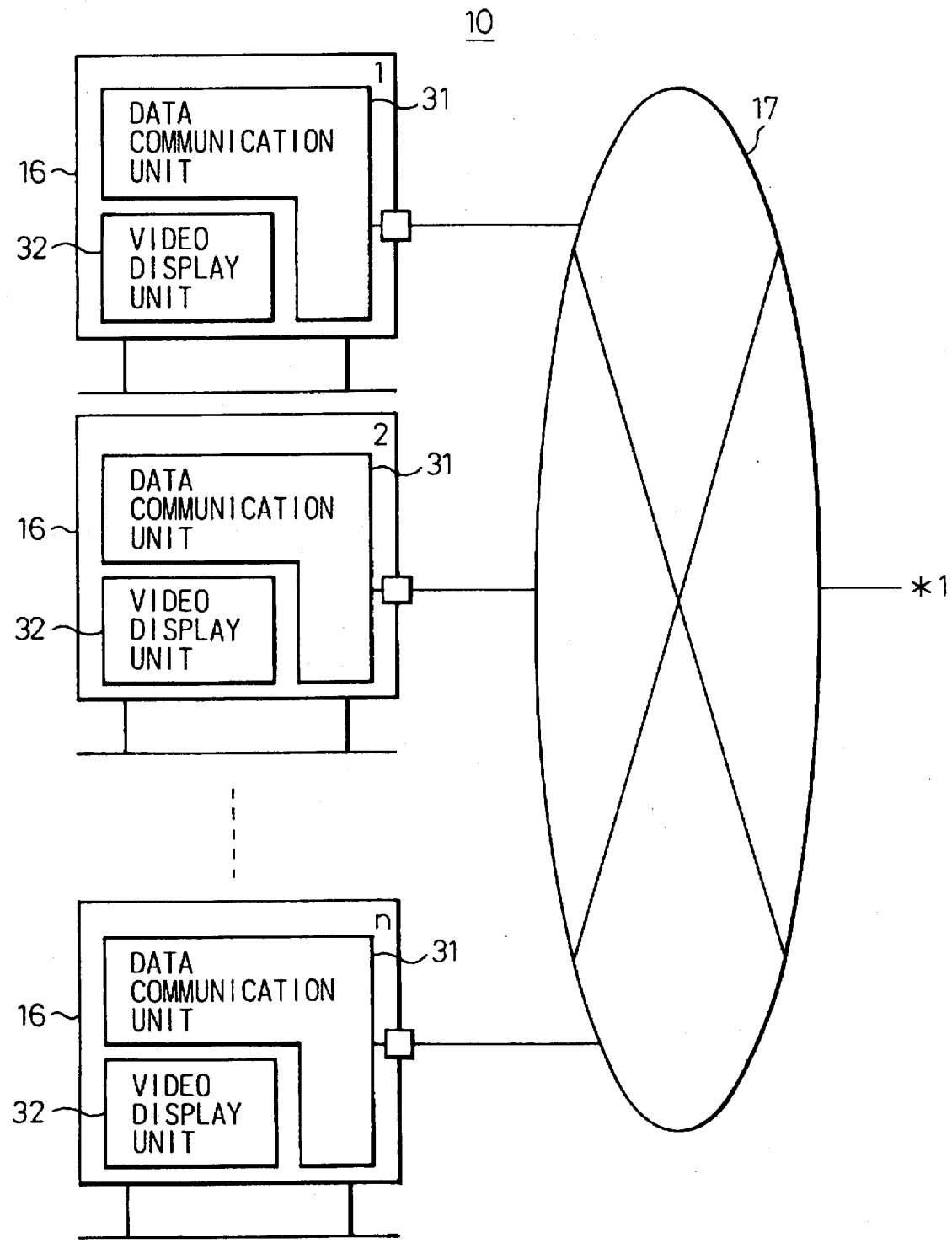
FIG. 2 is a first part of a more specific view of the basic configuration shown in FIG. 1.
Figure 3:
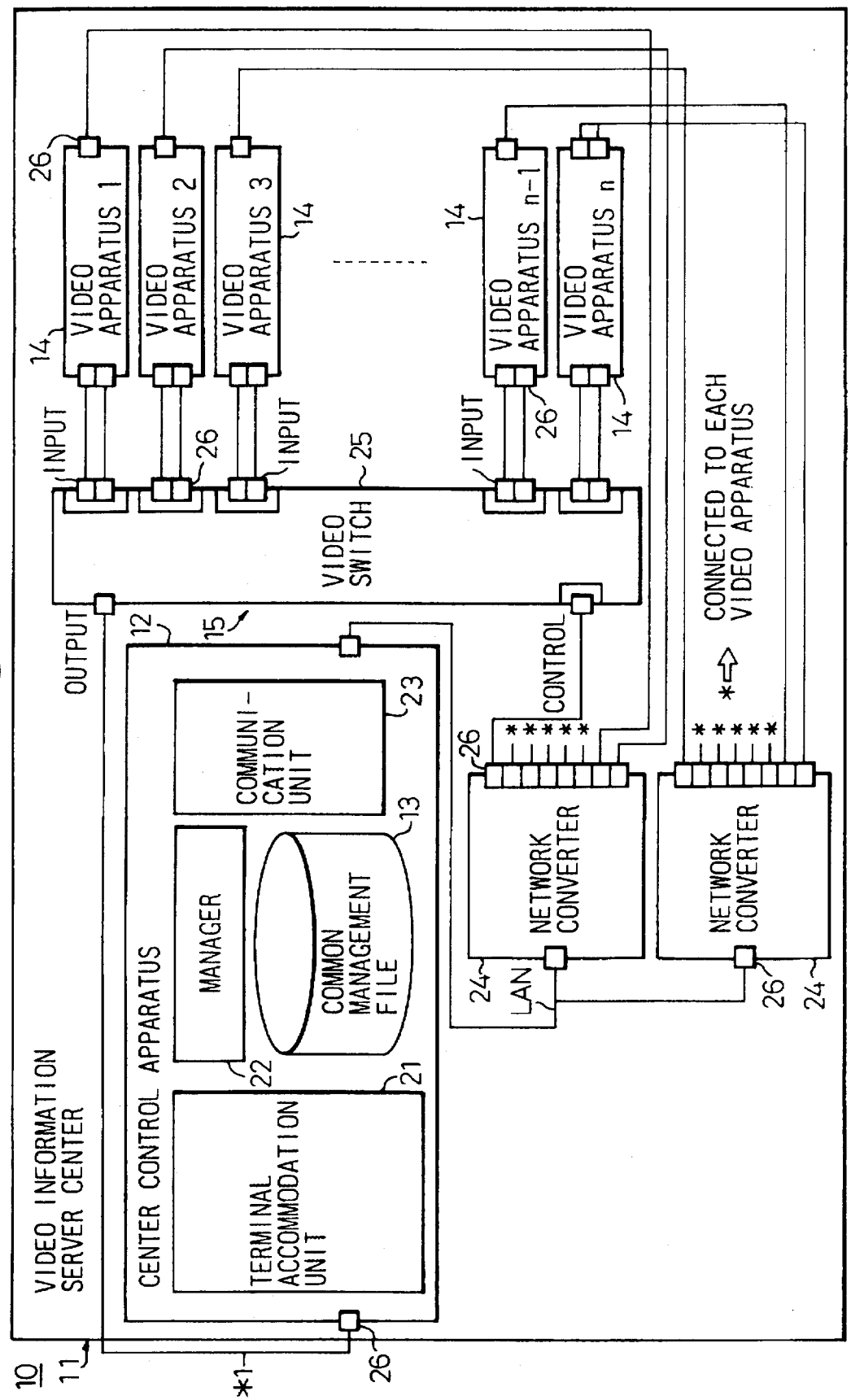
FIG. 3 is a second part of the more specific view of the basic configuration shown in FIG. 1.

FIGS. 2 and 3 are parts of a more specific view of the basic configuration shown in FIG. 1. Referring first to FIG. 2, there is shown a request terminal 16 side of a video information server system 10. The individual request terminals 16 each comprise a data communication unit 31 and a video display unit 32. A user at a request terminal 16 selects and acquires the desired video information through the video display unit 32, for example, a CRT. The video information is selected and provided by the data communication unit 31. The data communication unit 31 connects with the video information server center 11 (FIG. 3) through the communication network 17. The communication network 17 may be an ISDN or the like.

Referring next to FIG. 3, the center control apparatus 12 is comprised of a manager 22 which selects or remotely controls the video information in accordance with a request from a user while referring to the previously mentioned common management file 13, a communication unit 23 for communicating with the switching control channels 15 and the individual video information server apparatuses 14 based on the management or instructions of the manager 22, and a terminal accommodation unit 21 forming an interface between the center control apparatus 12 and the individual request terminals 16.

The terminal accommodation unit 21 prepares and sends out a menu of the video information for provision to the request terminals 16 in a manner whereby the user is not made aware of the differences in operation caused by the differences in the types of the video information server apparatuses 14. Conversely, it receives any remote control command from a request terminal 16 and instructs the manager 22 to perform the corresponding operation.

The manager 22 refers to the common management file 13 and sends to the communication unit 23 side the commands for the request from the user made through the terminal accommodation unit 21. Further, it administers the state of the individual video information server apparatuses 14, for example, the state of tape feed in the video cassette player.

The communication unit 23 has the switching control mechanism 15 perform the overall control for selecting the video information server apparatus 14 in accordance with the request from the user or remotely controlling the apparatus 14 to send the video information output from there to the communication network 17.

The switching control mechanism 15 may take various forms, but in the example shown in the figure, the case is shown of use of a local area network (LAN), a network converter 24, a video switch 25, and other components.

As the center control apparatus 12, use is made of a host computer supporting a TCP/IP interface. TCP is the acronym for a "transmission control protocol", while IP is the acronym for "internet protocol". Use is made of a network converter 24 for connecting the host computer connected on the LAN and the video switch 25 at the switching control mechanism 15 side including the individual video information server apparatuses 14 by a general purpose interface, that is, the RS-232C. Note that in the figure, the block shown by the reference numeral 26 expresses the RS-232C or other various connectors or serial ports.

The network converter is an apparatus for connecting a computer having the above TCP/IP interface, connected on the LAN based on ISO8802-3 (IEEE802.3), and the different types of terminal apparatuses by the above general purpose interface RS-232C. As illustrated, it is provided with a large number of serial ports (26). Accordingly, the network converter 24 is perfect as an apparatus for connecting the video switch 25 and the large number of video information server apparatuses 14 and host computer (12).

A video switch 25, as illustrated, is provided with a port for control from the communication unit 23, a port for output of video information to the communication network 17, and a large number of input ports for receiving various video information from the apparatuses 14. It connects to the output port with the input port leading to the desired video information server apparatus 14 in accordance with instructions from the control port. Note that the video switch 25 is comprised of a so-called matrix switch construction.

Accordingly, based on instructions from the manager 22 given through the communication unit 23, the connection path for sending to the communication network 17 the pictures, sound, news, or other video information from the video information server apparatus 14 requested by the user is set in the switching control mechanism 15.

Figure 4:
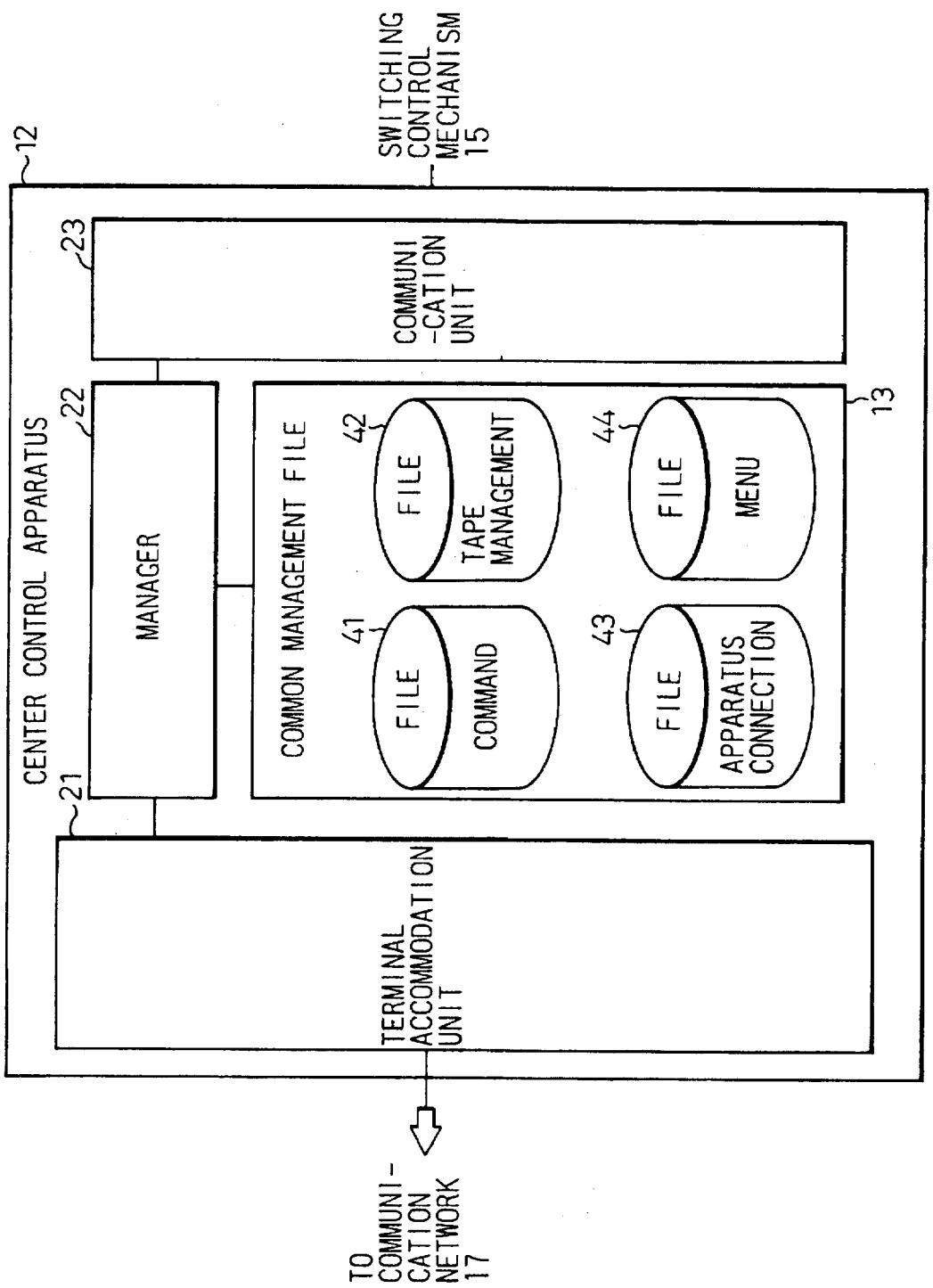
FIG. 4 is a view of a detailed example of a common management file 13 shown in FIG. 3.

FIG. 4 is a view of a detailed example of a common management file 13 shown in FIG. 3. The common management file 13 is shown more specifically as being comprised of four files 41, 42, 43, and 44. These files may be freely rewritten in content in accordance with any increases, changes, or elimination of video information server apparatuses 14.

The command file 41 has the conversion information for converting a remote control request from a request terminal 16 into command data (fast forward, playback, pause, etc.) tailored to the video information server apparatus relating to the request.

The tape management file 42 stores the management data for monitoring the feed of the video tape when the video information server apparatus 14 handles video tape. This management data includes the tape speed of the video tape, the acceleration at the time of start of the feed of the video tape, the deceleration at the end of the feed of the video tape, etc.

When the apparatus 14 to be controlled is a video cassette player, accepts only requests from the outside, and does not send back information it holds itself to the outside, the manager 22 in the center control apparatus 12 has to maintain a constant grasp over the current position of the feed of the video tape when controlling the apparatus 14. There is the following method for this.

At the time of the start of the supply of the video information, the video cassette is rewound to its start. When there is a request from the terminal 16 for running the tape, for example, playing it back or fast forwarding it, the manager 22 issues a command to the apparatus 14 and at the same time sets a timer (not shown). When desiring to determine the current state of feed of the tape (current position), its examines the value of the timer to obtain the time taken up to then. It can then determine the current state of feed of the tape (current position) from the acquired time, the tape speed, the acceleration at the time of start of tape feed, and the deceleration at the time of the end of the tape feed. Due to this, even with an apparatus 14 which does not send back to the outside information on what state it is currently in, it is possible to provide a service the same as with an apparatus provided with a function of returning information on what position on the tape is currently being played back etc.

Further, it is possible to calculate the length by which the tape is to be advanced from the destination on the tape and the speed of tape feed and possible to calculate the actual time until reaching the destination from that length, the tape speed, the acceleration at the time of start of tape feed, and the deceleration at the time of the end of the tape feed. These calculations are performed by a calculation means (software) in the manager 22.

The apparatus connection file 43 of FIG. 4 holds the connection data for setting the connection path in the switching control mechanism 15, which connection path is to be set up between the video information server apparatus 14 providing the video information requested from the request terminal 16 and both the communication unit 23 and the communication network 17. The communication unit 23 sets the channel in the switching control mechanism 15 based on this connection data.

The menu file 44 of FIG. 4 holds the data (list) concerning all of the sources of the video information held in the video information server center 11. When display of the menu is requested by the user, this is sent from the file 44 through the terminal accommodation unit 21 to the request terminal 16 of that user. When the user selects the desired video information from the menu and this is sent back to the manager 22 of the center 11, the apparatus 14 having the selected video information is selected and the apparatus 14 and terminal 16 are connected.

When adding, changing, suspending, etc. the available video information, it is sufficient to rewrite the menu file 44.

Figure 5:
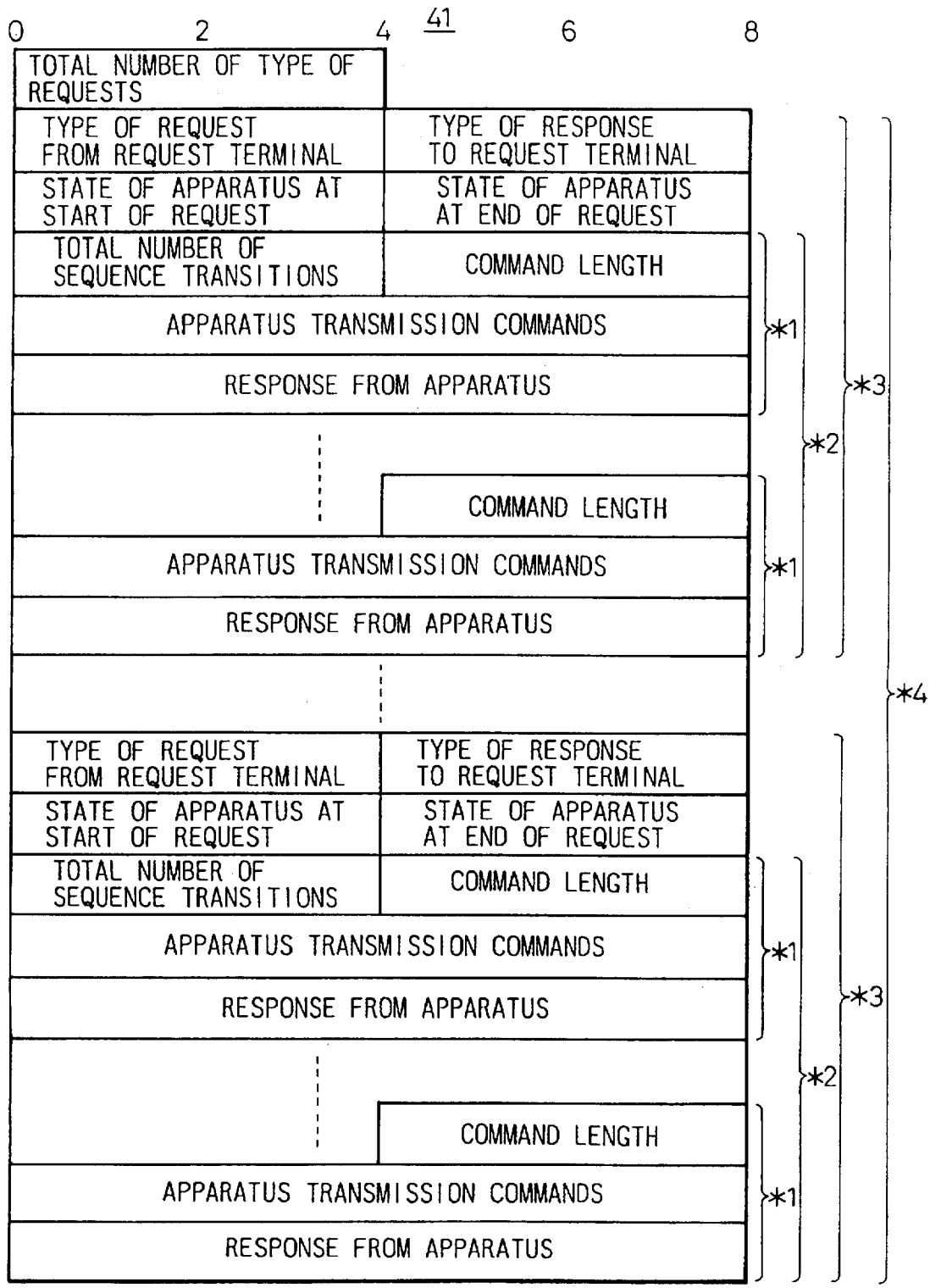
FIG. 5 is a view of a detailed example of a command file 41 shown in FIG. 4.

FIG. 5 is a view of a detailed example of a command file 41 shown in FIG. 4.

In the figure, the section shown by *1 indicates the region of one sequence's worth of information, the section shown by *2 indicates the region of information comprised of a number of sequences' worth of information corresponding to exactly the total number of sequence transitions, *3 indicates the region of information of one type of request, and *4 indicates the region of information comprised of information of a number of types of requests corresponding to exactly the total number of types of requests.

The "total number of types of requests" in FIG. 5 means the total number of requests (request for playback, request for fast forward, etc.) which can be made from a request terminal to the video information server center. The "type of request from a request terminal 16" means the type of request (request for playback, request for fast forward, etc.) made from a request terminal to the video information server center. The "type of response to the request terminal 16" means the type of notification to the request terminal as to if the requested task was able to be performed for a request from the request terminal (end of playback, end of fast forward, etc.). The "state of the apparatus 14 at the start of the request" means the state of the apparatus for receiving the request (playback, fast forward, etc. in progress). The "state of the apparatus 14 at the end of the request" means the state of the apparatus as changed by the execution of the request (now in playback, in fast forward, etc.) The "total number of sequence transitions" means the total number of commands issued to an apparatus for changing the apparatus to a requested state for a single request from the request terminal. The "command length" means the bit length of the commands sent. The "apparatus transmission commands" include the command data for playback, fast forward, and other operations. The "response from the apparatus 14" includes the response commands to be returned when there is a function for returning a response from the apparatus.

FIG. 6 is a view of a detailed example of a tape management file 42 shown in FIG. 4. In the figure, the section labeled as "information for one apparatus" stores information on one video information server apparatus 14. The file 42 as a whole stores the total number of apparatus' worth of sets of information. The content stored is as illustrated. Referring to the content of the file 42, the manager 22 calculates at least one of the current position of the feed of the video tape, the "playback ratio", showing what ratio of one unit of video data has been played back, and the search time, showing when the video information requested from the request terminal 16 can be started to be provided, using internal calculation means (software).

In the request terminal 16, a time display window for providing information on the search time until the start of the display of the desired video information on the video display unit, prepared based on the results of the calculation given above, is received through the communication network 17 and shown on the video display unit 32.

FIG. 7 is a view of a detailed example of an apparatus connection file 43 shown in FIG. 4. In the figure, the section labeled as "one connected apparatus worth of information" stores the information on one video information server apparatus 14. The file 43 as a whole stores the total number of apparatus' worth of sets of information.

At the "type of connected apparatus", whether the apparatus is a video cassette player, a video disk player, etc. is shown. The "name of connected host" means the name of the host of the network converter having a serial port to which the video information server apparatus to be controlled is connected. The "connected port no." designates the one serial port in question in the network converter 24. The "video switch input side channel no." designates one input port among the group of input ports of the video switch 25.

FIG. 8 is a view of a detailed example of a menu file 44 shown in FIG. 4. In the figure, the "total number of titles" shows the total number of sets of video information available from the center 11. The "picture identifier" is the ID of the video information requested by the user. The "connected apparatus type" specifies the one apparatus 14 storing the video information. The "start time code (frame)" is the time, in the case where the video information is provided on a video tape, on the video tape when starting to play back the video information. The "end time code" is the time on the video tape when the provision of information is ended.

Figure 9:
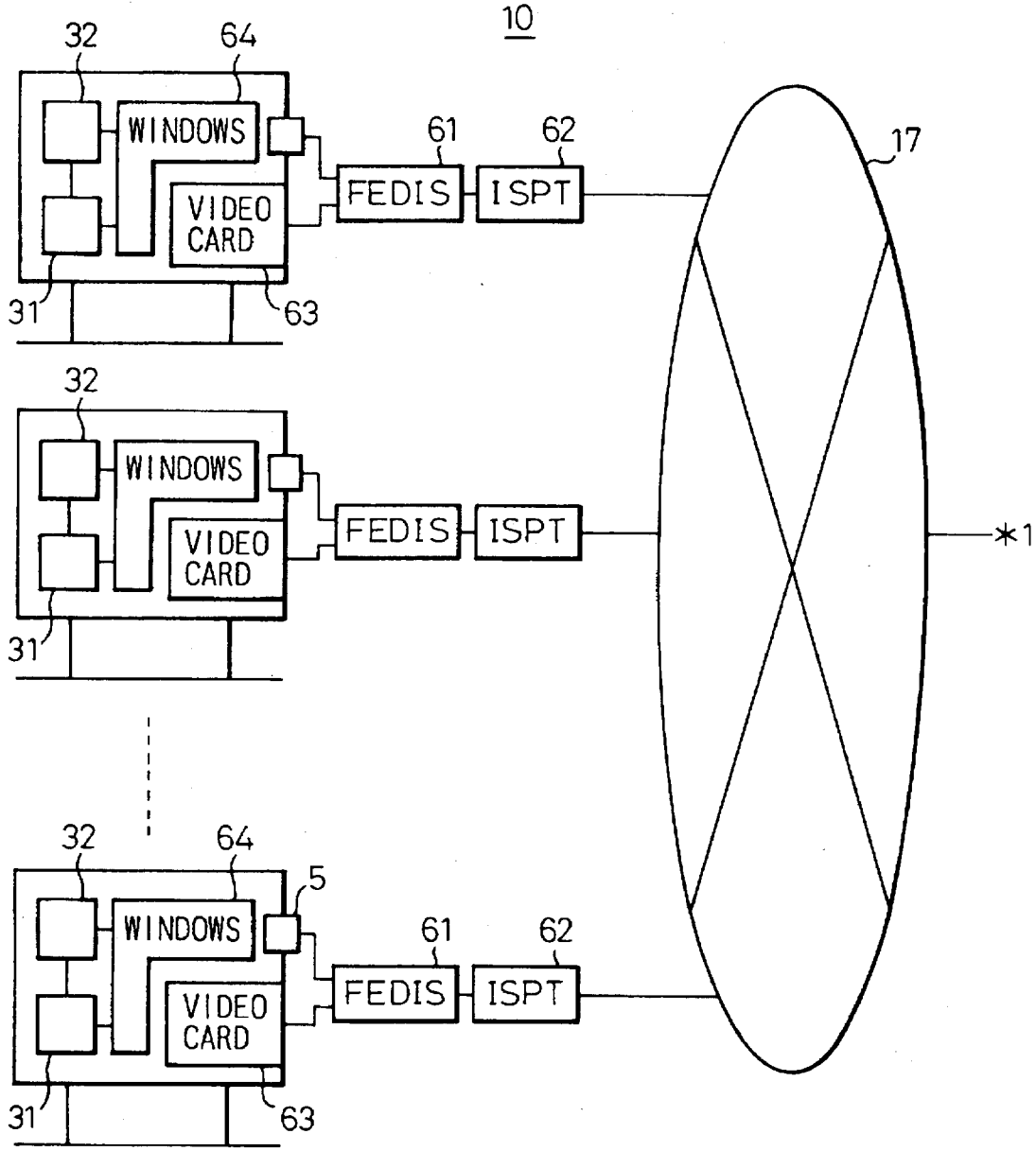
FIG. 9 is a first part of a view of a more specific example of part of the configuration shown in FIG. 2 and FIG. 3.
Figure 10:
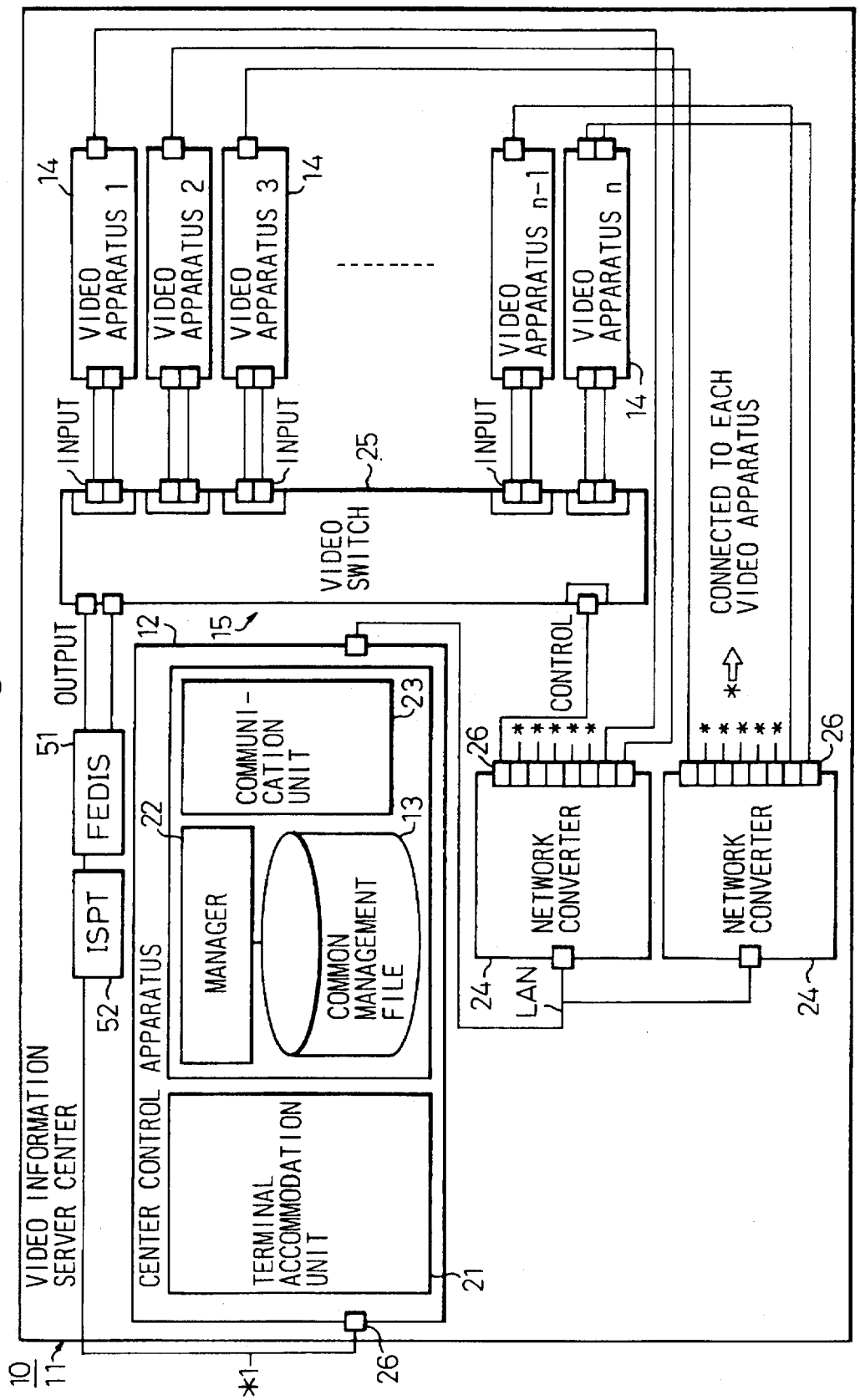
FIG. 10 is a second part of the view of a more specific example of part of the configuration shown in FIG. 2 and FIG. 3.

FIGS. 9 and 10 are parts of a view of a more specific example of part of the configuration shown in FIG. 3 and FIG. 4. The configuration shown in FIG. 9 corresponds to the configuration shown in FIG. 2, but in the configuration of FIG. 9, there are further shown a FEDIS 61, ISPT 62, Windows 64, and video card 63. The FEDIS 61 is a motion video use high performance coding/decoding apparatus, while the ISPT 62 is a terminal adapter for an INS net. The video card 63 fetches video information sent from the video information server center 11 through the communication network 17. The data communication unit 31 operates by Windows (trademark of operating system of Microsoft Corporation of the U.S.) 64. The data communication unit 31 controls the video card 63 and serial port 5, controls the protocol with the center 11, and controls the display of the video information fetched by the video card 63 on the video display unit 31.

The configuration shown in FIG. 10 corresponds to the configuration shown in FIG. 4, but in the configuration shown in FIG. 10, the FEDIS 51 and ISPT 52 are further shown. These perform similar functions to the above-mentioned FEDIS 61 and ISPT 62.

FIGS. 11A, 11B, 12A and 12B are parts of a sequence diagram showing a first example of the operation of the system as a whole. In these figures, the plurality of vertical lines show the portions constituting the system. The vertical line at the left end shows the portion of the request terminal 16, while the other vertical lines show the portions of the video information server center 11. The portions of the center 11 further show, from the left to right, the terminal accommodation unit 21, the manager 22, the common management file 13, the communication unit 23, and the video apparatus (video information server apparatus 14). This will be explained in brief along with the sequence of the drawings.

<1> A request for connection is issued from the request terminal 16.

<2> The manager 22 sends back a response of completion of connection.

<3> The request terminal 16 next issues a request for obtaining the menu.

<4> The menu file 44 is searched.

<5> The menu is prepared.

<6> The user at the request terminal 16 selects the video he or she desires to view.

<7> As a result of the selection, a request for playing back video information is issued in the form of a picture identifier.

<8> The command file 41, tape management file 42, apparatus connection file 43, and menu file 44 are searched.

<9> The corresponding information is obtained by referring to the group of files 41, 42, 43, and 44.

<10> The manager changes the video apparatus controlled up to then to the video apparatus for the request of the user. Toward that end, first, it issues a break off command to the video apparatus controlled up to then.

<11> The video apparatus thus commanded breaks off.

<12> The manager then issues a request for connection to the video switch 25 so as to connect with the video apparatus for the request of the user.

<13> When the connection is completed, a response is sent back.

<14> The manager outputs a request to issue an input/output switching command to the connected video switch 25. This is to set up a connection path between the input port and output port in the video switch 25.

<15> The manager confirms that the connection path has been set up. The request for connection issued at <12> above achieves its object, so next the manager issues a request for breaking the connection with the video switch 25.

<16> Finally the manager issues a request for connection between the video apparatus for the request of the user and the communication unit 23. When this is completed, the video information starts flowing to the user for the first time.

FIGS. 13A, 13B, and 14 are parts of a sequence diagram showing a second example of the operation of the system as a whole. FIGS. 13A and 13B show the case where the request terminal 16 requests video information supplied from a video cassette player (14) as the video information.

<1> The manager 22 first calculates the search time by the calculation means. The data clear to the calculation means are (i) the current time code and (ii) the time code to be searched, that is, the time on the video tape when the desired video information should start to be played back. Accordingly, from these time codes, the time code of movement, that is, how many minutes worth of the tape should be fast forwarded/rewound in terms of the time on the video tape, is known.

From the time code of movement and the speed of normal tape feed of the video tape, the length of the video tape to be searched is determined. From both (i) the length of the video tape to be searched and (ii) the speed of tape feed, acceleration, and deceleration at the time of fast forwarding/rewinding the video tape, it is possible to calculate the time required for a search.

<2> The time required for the search, that is, the "waiting time", is notified to the request terminal 16.

<3> The manager issues to the communication unit 23 a request for search of the selected video information so as to give a command for a search of the video information requested to the video information server apparatus 14.

<4> When the search ends, the response is sent back.

<5> Next, a playback request is issued so as to output a playback command of the video tape to be given to the apparatus 14.

<6> A playback response is sent back to the request terminal 16 from the apparatus for the above playback command.

<7> The desired motion video is sent to the user.

FIG. 14 shows the case of stopping the transmission of the video while it is being watched.

<8> A "request for stopping" of the video tape remotely controlled by the request terminal 16 reaches the manager 22.

<9> The manager 22 refers to the command file 41 to obtain the sequence/command information. The sequence/command information is the information showing the commands actually issued by the communication unit to the video information server apparatus and the responses to the same and the order of issuance.

<10> Based on this information, the manager requests that the communication unit 23 issue a stop command to the apparatus 14.

<11> The video cassette player (14) stops the playback of the motion video being transmitted.

<12> A response of the completion of the stopping of the playback of the video is sent back to the request terminal 16.

<13> The user instructs the video information server center 11 to end the VOD service by remote control.

Figure 16A:
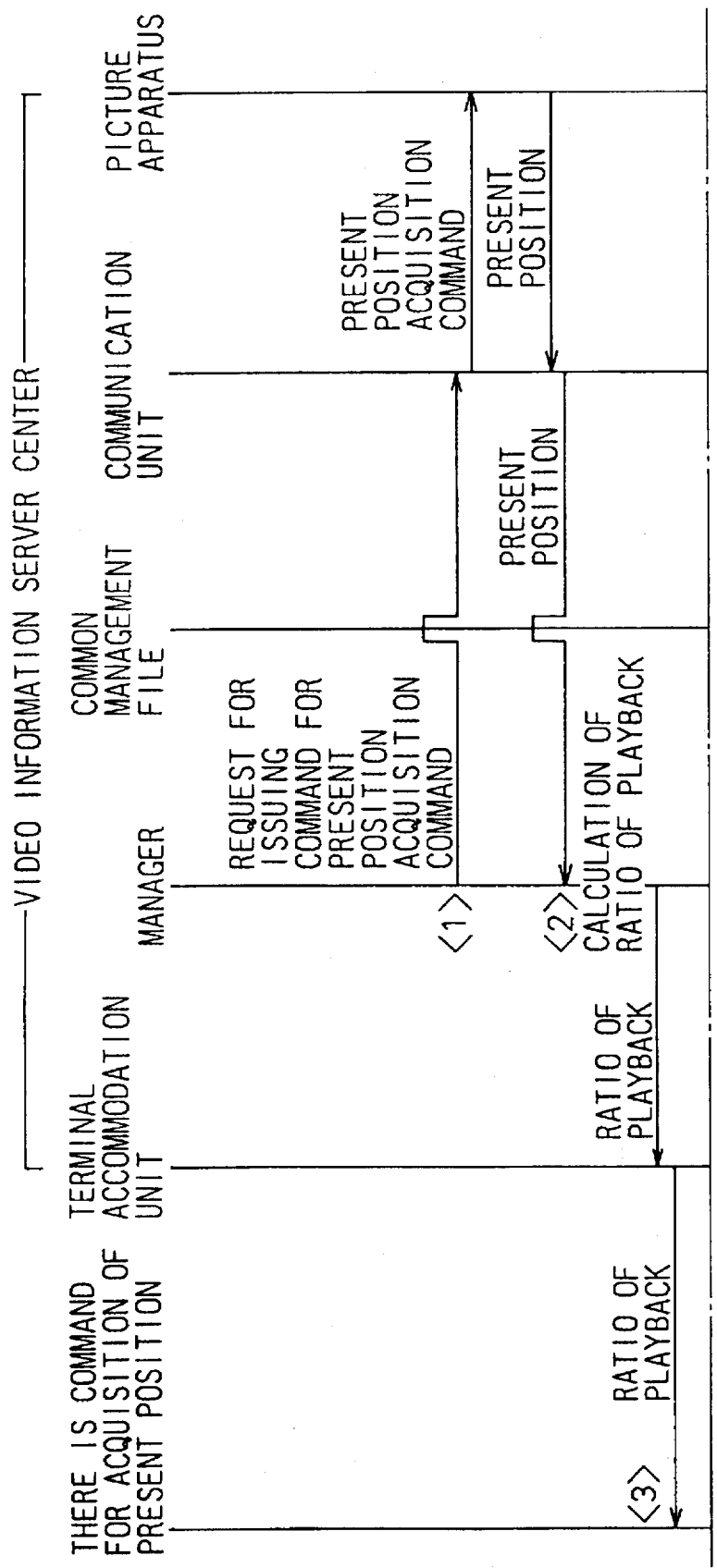

FIGS. 15A and 15B are sequence diagrams showing a third example of the operation of the system as a whole, while FIGS. 16A and 16B are sequence diagrams showing a fourth example of the operation of the system as a whole. FIGS. 15A and 15B are sequence diagrams showing the transfer of commands to be executed with the switching control mechanism 15 in the case where the "VOD service end request" shown in FIG. 14 is given to the manager 22.

<1> The manager 22 executes the series of sequences for breaking the connection between the communication unit 23 and the switching control mechanism 15 and apparatus 14.

Figure 12A:
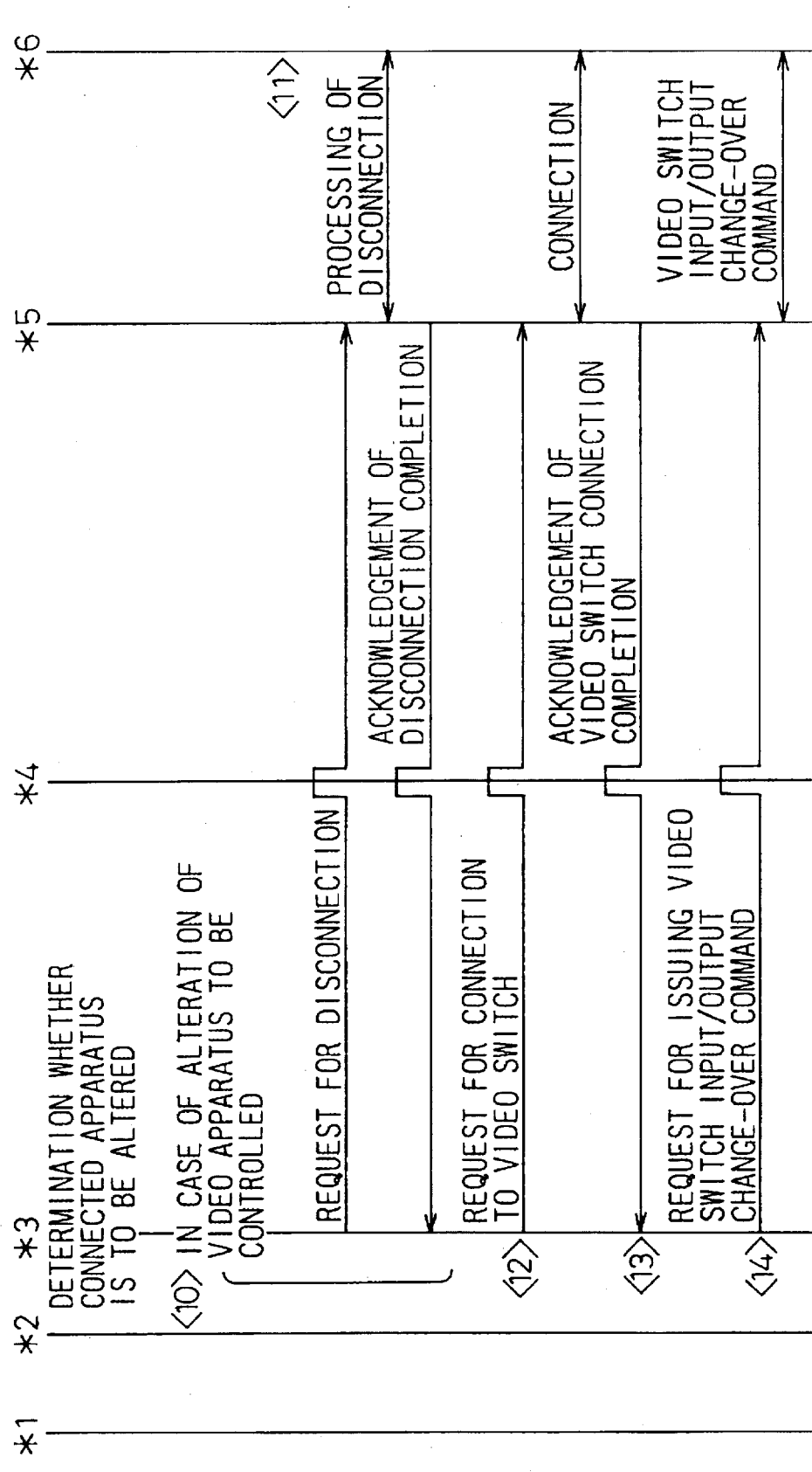
FIGS. 12A and 12B are second part of the sequence diagram showing a first example of the operation of the system as a whole.
Figure 12B:
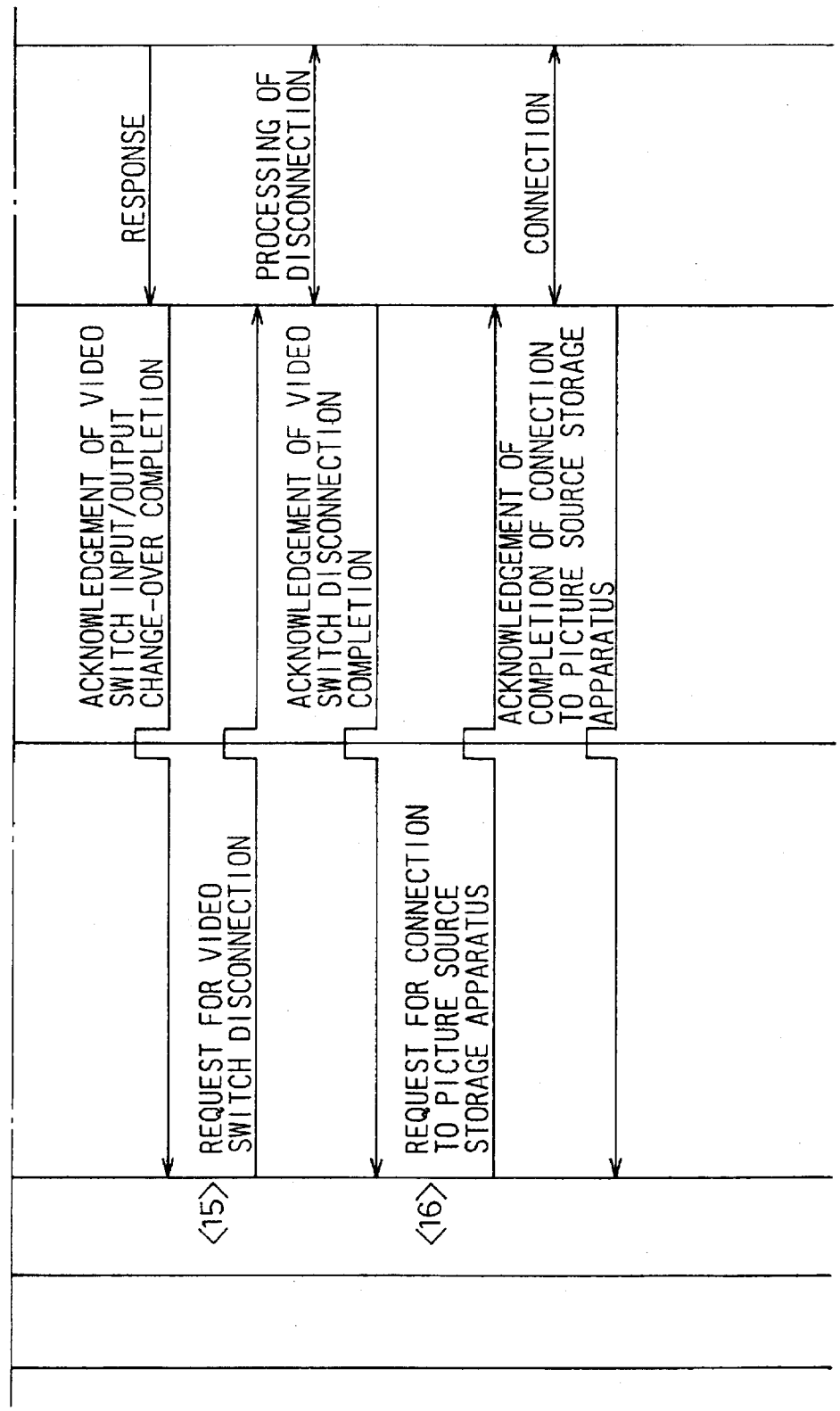

Note that the sequence of <1> corresponds to the sequence of FIGS. 12A and 12B. However, FIGS. 12A and 12B showed the series of sequences in the case of connecting with the apparatus 14. This is opposite to the case of disconnecting with the apparatus 14 shown in FIGS. 15A and 15B.

<2> A response of the end of the VOD service is sent back to the request terminal 16, whereby <3> the path on the communication network 17 is broken.

FIGS. 16A and 16B show an example of the operation in the case where there is a query about the playback ratio of the video tape from the user during the transfer of the motion video shown in the last column of FIG. 13B. That is, it shows the case where a command for acquiring the current position on the video tape is issued from the user.

<1> A request from the manager 22 to the video information server apparatus 14 for issuing a command for acquiring a current position is transferred to the communication unit 23.

<2> The manager 22 calculates the playback ratio when notified as to the current position. In this case, the current time code is sent back from the video information server apparatus 14.

The playback ratio is calculated by the calculation means in the manager 22 in accordance with the calculation formula given below:

Playback ratio=[(current time code−start time code)/(end time code−start time code)]×100

The above calculation formula shows the interim playback ratio in percent using the start of playback as 0 percent and the end of playback as 100 percent. The start time code is the time on the video tape when starting the play back on the video tape, the current time code shows the time at the point where there is a query as to the playback ratio, and the end time code is the time obtained by adding the running time to the start time code.

<3> The results of the calculation of the above formula are notified to the user.

Next, another embodiment (of the case where the apparatus 13 does not send back a response) is shown.

<1'> A request for playback, that is, a request for playback of desired video information from a request terminal, is transferred from the manager 22 to the communication unit 23.

<2'> When the response to the request is received, the timer is set. The time is obtained when the playback ratio of the video tape is to be obtained and the playback ratio is calculated by the above formula.

<3'> The playback ratio is notified to the user.

The first to 13th embodiments of the present invention explained above have the following advantageous effects.

In the first embodiment of the present invention, a VOD server system is realized wherein the user is not made aware of the differences in operation caused by differences in the types of the video information server apparatuses 14.

In the second embodiment of the present invention, a video information server center is realized having the effect of the first embodiment.

In the third embodiment of the present invention, a flexible center is realized which can handle any increases, changes, or elimination of video information server apparatuses 14 providing the video information just by rewriting the content of the common management file 13.

In the fourth embodiment of the present invention, it becomes possible to flexibly handle the different remote control operations of the apparatuses 14.

In the fifth embodiment of the present invention, it is possible for the manager 22 in the center, not the apparatus 14 itself, to monitor the running of the tape when the apparatus 14 is one which uses a video tape.

In the sixth embodiment of the present invention, the connection path for selecting the desired apparatus 14 and supplying the video information from the apparatus 14 to the user can be freely and quickly formed by previously prepared connection data.

In the seventh embodiment of the present invention, the updated list of the latest titles can be displayed to the users at all times.

In the eighth embodiment of the present invention, it is possible to predict by calculation in the center 11 the time until obtaining a desired video information.

In the ninth embodiment of the present invention, a specific configuration of the center 11 is provided.

In the 10th embodiment of the present invention, it becomes easy to switch connections between the center control apparatus 12 and the apparatuses 14 and connections between the apparatuses 14 and the communication network 17.

In an 11th embodiment of the present invention, the connections between a large number of apparatuses 14 and a host computer (center control apparatus 12) can be inexpensively realized.

In the 12th embodiment of the present invention, a request terminal 16 is realized which enables a user to remotely control a plurality of apparatuses 14 without having to be aware of the differences in the types of the apparatuses.

In the 13th embodiment of the present invention, a request terminal 16 is realized which enables the user to be provided with information on the waiting time.

We claim:

1. A video information server system comprising
a plurality of request terminals which request desired video information from a plurality of types of video information and receive that video information through a communication network, and
a video information server center provided with a plurality of video information server apparatuses of different types, which hold the plurality of types of video information and can be controlled by control signals from the outside, and center control apparatus which controls the video information server apparatuses through a switching control mechanism, selects one of the plurality of video information server apparatuses in accordance with a request from a request terminal received through the communication network, and sends from the selected video information server apparatus video information through the communication network to the request terminal, wherein
the requests from the request terminals are generic requests compatible with all of the plurality of different types of video information server apparatuses, a common management file in the center control apparatus includes a command file for storing data for converting the generic requests from the request terminals into commands tailored to the individual video information server apparatuses, and the control apparatus selects and controls the video information server apparatus for a specific request out of the plurality of video information server apparatuses through the switching control mechanism, and sends the video information for the request to the request terminal through the switching control mechanism and the communication network.

2. A video information server center provided with a plurality of different video information server apparatuses which hold a plurality of types of video information and can be controlled by control signals from the outside and a center control apparatus which controls the video information server apparatuses through a switching control mechanism, selects one of the plurality of video information server apparatuses in accordance with a request from a request terminal to receive video information, and sends from the selected video information server apparatus the requested video information to the request terminal, wherein
the requests from the request terminals are generic requests compatible with all of the plurality of different types of video information server apparatuses, a common management file
includes a command file for storing data for converting the generic requests from the request terminals into commands tailored to the individual video information server apparatuses, and the video information server apparatus for a specific request out of the plurality of video information server apparatuses is selected and controlled through the switching control mechanism, and the video information for the request is sent to the request terminal through the switching control mechanism.

3. A video information server center as set forth in claim 2, wherein the content of the common management file can be rewritten in accordance with an increase, change, or elimination of video information server apparatus.

4. A video information server center as set forth in claim 2, wherein the common management file includes a tape management file for storing management data for monitoring the feed of the video tape for video information server apparatuses handling video tape.

5. A video information server center as set forth in claim 2, wherein the common management file includes an apparatus connection file for storing the connection data for connecting through the switching control mechanism the video information server apparatus holding the video information relating to the request from the request terminal and the center control apparatus.

6. A video information server center as set forth in claim 2, wherein the common management file includes a menu file for storing data relating to the video information held by the individual video information server apparatuses.

7. A video information server center as set forth in claim 4, wherein a manager for referring to the content of the common management file is provided, which manager includes a calculation means for referring to the tape management file and calculating at least one of the current position of the feed of the video tape, the "playback ratio", showing what ratio of one unit of video data has been played back, and the search time, showing when the video information requested from the request terminal can be started to be provided.

8. A video information server center as set forth in claim 2, wherein the center control apparatus is comprised of
a terminal accommodation unit for connecting with a plurality of request terminals through the communication network,
a manager for referring to the content of the common management file based on requests from individual request terminals obtained through the terminal accommodation unit, and
a communication unit for setting in the switching control mechanism the connection path for sending out to the communication network the video information from the video information server apparatus relating to the request based on the result of the reference of content by the manager.

9. A video information server center as set forth in claim 8, wherein the switching control mechanism includes a video switch for setting up a connection path with the requested video information server apparatus designated through the communication unit.

10. A video information server center as set forth in claim 9, wherein a network converter connected with the communication unit through a local area network (LAN) and provided with a plurality of serial ports is included in the switching control mechanism and the individual video information server apparatuses and the video switch are connected through the respectively corresponding serial ports.

11. A request terminal comprised of a data communication unit for connection through a communication network to a video information server center provided with a plurality of different types of video information server apparatuses and a common management file enabling control of these plurality of video information server apparatuses in a compatible manner and a video display unit for showing the video information supplied through the communication network and the data communication unit.

12. A request terminal as set forth in claim 11, wherein a time display window for providing information on a search time until a start of provision of a desired video information on the video display unit, calculated by the video information server center and sent through the communication network, is formed on the screen of the video display unit in the request terminal.

* * * * *